(12) United States Patent
Nakamura et al.

(10) Patent No.: US 11,077,941 B2
(45) Date of Patent: Aug. 3, 2021

(54) WING FLAPPING APPARATUS

(71) Applicant: Murata Manufacturing Co., Ltd., Nagaokakyo (JP)

(72) Inventors: Kazutaka Nakamura, Nagaokakyo (JP); Tomoyuki Miyake, Sakai (JP); Masanori Kato, Nagaokakyo (JP); Masaki Hamamoto, Sakai (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 550 days.

(21) Appl. No.: 16/106,806

(22) Filed: Aug. 21, 2018

(65) Prior Publication Data

US 2019/0002097 A1  Jan. 3, 2019

Related U.S. Application Data

(63) Continuation of application No. PCT/JP2017/001944, filed on Jan. 20, 2017.

(30) Foreign Application Priority Data

Feb. 29, 2016 (JP) .............................. JP2016-037484

(51) Int. Cl.
*B64C 33/02* (2006.01)
*F16H 1/20* (2006.01)

(52) U.S. Cl.
CPC .............. *B64C 33/02* (2013.01); *F16H 1/20* (2013.01); *B64C 2201/025* (2013.01); *B64C 2201/042* (2013.01)

(58) Field of Classification Search
CPC ........ B64C 2201/025; B64C 2201/042; B64C 33/02; F16H 1/20
See application file for complete search history.

(56) References Cited

U.S. PATENT DOCUMENTS 7,651,051 B2 *  1/2010  Agrawal ............... B64C 39/028
                                                        244/22
8,205,823 B2 *  6/2012  Keennon ............... B64C 33/025
                                                        244/22
(Continued)

FOREIGN PATENT DOCUMENTS

FR            376962 A  *  8/1907  ............. B64C 33/00
JP        2011073673 A      4/2011
(Continued)

OTHER PUBLICATIONS

International Search Report issued for PCT/JP2017/001944, dated Feb. 21, 2017.

*Primary Examiner* — Philip J Bonzell
(74) *Attorney, Agent, or Firm* — Arent Fox LLP

(57) ABSTRACT

A wing flapping apparatus includes a motive power source; a power transmission mechanism; and a wing unit driven by the power transmission mechanism. The power transmission mechanism includes a rotation transmission member configured to rotate upon reception of motive power transmitted from the motive power source; a slider configured to linearly reciprocate in an X-axis direction upon reception of the motive power transmitted from the rotation transmission member and a rotating body configured to reciprocate in a rotation direction upon reception of the motive power transmitted from the slider. The wing unit is configured to swing such that its distal end moves approximately in the X-axis direction as the rotating body reciprocates in the rotation direction. The power transmission mechanism further includes a pair of crank arms each configured to connect the rotation transmission member and the slider. The pair of crank arms each has: one end rotatably connected to the rotation transmission member and the other end rotatably and slidably connected to the slider.

10 Claims, 17 Drawing Sheets

(56) References Cited

U.S. PATENT DOCUMENTS

| | | | | |
|---|---|---|---|---|
| 8,210,471 B2* | 7/2012 | Keennon | ................ | B64C 33/02 244/22 |
| 9,669,925 B2* | 6/2017 | Keennon | ............... | B64C 39/003 |
| 9,950,790 B2* | 4/2018 | Keennon | ................ | B64C 33/02 |
| 9,957,044 B2* | 5/2018 | Keennon | ................ | B64C 33/025 |
| 10,065,737 B2* | 9/2018 | Keennon | ............... | B64C 39/028 |
| 10,266,258 B2* | 4/2019 | Keennon | ............... | B64C 33/025 |
| 10,850,837 B2* | 12/2020 | Keennon | ................ | B64C 33/02 |
| 10,919,623 B2* | 2/2021 | Keennon | ................ | B64C 33/02 |
| 2007/0205322 A1* | 9/2007 | Liao | ..................... | B64C 39/028 244/22 |
| 2007/0210207 A1* | 9/2007 | Liao | ..................... | B64C 39/028 244/22 |
| 2007/0262194 A1* | 11/2007 | Agrawal | ............... | B64C 39/028 244/11 |
| 2010/0308160 A1* | 12/2010 | Keennon | ................ | B64C 33/025 244/22 |
| 2012/0048994 A1* | 3/2012 | Keennon | ................ | B64C 19/00 244/22 |
| 2013/0168493 A1* | 7/2013 | Keennon | ................ | B64C 33/02 244/22 |
| 2014/0158821 A1* | 6/2014 | Keennon | ................ | B64C 33/02 244/72 |
| 2015/0008279 A1* | 1/2015 | Keennon | ............... | B64C 33/025 244/22 |
| 2015/0115097 A1* | 4/2015 | Keennon | ................ | B64C 33/02 244/39 |
| 2015/0307191 A1 | 10/2015 | Samuel et al. | | |
| 2017/0183092 A1* | 6/2017 | Keennon | ................ | B64C 33/02 |
| 2017/0291703 A1* | 10/2017 | Keennon | ............... | B64C 39/003 |
| 2018/0079504 A9* | 3/2018 | Keennon | ............... | B64C 19/00 |
| 2018/0208306 A1* | 7/2018 | Keennon | ............... | B64C 33/025 |
| 2018/0244382 A1* | 8/2018 | Nakamura | ............ | B64C 33/02 |
| 2019/0055014 A1* | 2/2019 | Keennon | ............... | B64C 39/028 |
| 2019/0202553 A1* | 7/2019 | Keennon | ............... | B64C 19/00 |
| 2019/0263517 A1* | 8/2019 | Nakamura | ............ | B64C 33/02 |
| 2020/0172240 A1* | 6/2020 | Karasek | ............... | A63H 27/008 |
| 2020/0324892 A1* | 10/2020 | Benedict | ............... | B64C 3/185 |

FOREIGN PATENT DOCUMENTS

| | | |
|---|---|---|
| JP | 2012529398 A | 11/2012 |
| JP | 2015174538 A | 10/2015 |

* cited by examiner

WING FLAPPING APPARATUS

CROSS REFERENCE TO RELATED APPLICATIONS

The present application is a continuation of International application No. PCT/JP2017/001944, filed Jan. 20, 2017, which claims priority to Japanese Patent Application No. 2016-037484, filed Feb. 29, 2016, the entire contents of each of which are incorporated herein by reference.

TECHNICAL FIELD

The present invention relates to a wing flapping apparatus configured to achieve levitation force by swinging of wing units driven by a motive power source installed in a frame body.

BACKGROUND ART

Generally, a wing flapping apparatus is configured to have a frame body provided with a wing unit on each of its port side and starboard side. Each wing unit is driven by a motive power source installed in the frame body. At this time, each wing unit, which has a proximal end located on the frame body side and a distal end located on the opposite side of the proximal end, swings such that the distal end moves approximately in the front-rear direction about the proximal end as the center of rotation.

For example, Japanese Patent National Publication No. 2012-529398 (PTD 1) discloses, in FIG. 9, a wing flapping apparatus configured such that a rocker arm is attached at the proximal end of a mast having a wing unit attached thereto, in which the rotational motion output from the rotary motor serving as a driving source is converted by a crank into a reciprocating linear motion, thereby causing the rocker arm to be periodically pushed and pulled, to allow the rocker arm to drive the mast, so that the wing unit swings in the front-rear direction.

In this case, in the wing flapping apparatus including a wing unit configured to swing in the front-rear direction, the moving speed of the wing unit needs to be accelerated as much as possible, and also, it is important to configure the wing unit so as to reliably swing back. When the wing unit moves at a slow speed, the levitation force of the wing flapping apparatus is low. Also when the wing unit incompletely swings back, the attitude of the wing flapping apparatus becomes unstable. In each of the cases, the motion efficiency decreases, so that the flight ability significantly deteriorates.

Thus, the present invention has been made in light of the above-described problems. An object of the present invention is to provide a wing flapping apparatus that is improved in motion efficiency.

BRIEF SUMMARY OF THE INVENTION

A wing flapping apparatus according to the first aspect of the present invention includes: a frame body; a motive power source installed in the frame body; a wing unit; and a power transmission mechanism configured to transmit motive power generated in the motive power source to the wing unit. The wing unit is configured to be driven by the power transmission mechanism. The power transmission mechanism includes: a rotation transmission member movably supported by the frame body, the rotation transmission member being configured to rotate about a first rotation axis as a center of rotation upon reception of the motive power transmitted from the motive power source; a slider movably supported by the frame body, the slider being configured to linearly reciprocate in a first direction upon reception of the motive power transmitted from the rotation transmission member; and a rotating body rotatably supported by the frame body, the rotating body being configured to, upon reception of the motive power transmitted from the slider, reciprocate in a rotation direction about a second rotation axis as a center of rotation, the second rotation axis extending in a second direction that is orthogonal to the first direction. The wing unit has a proximal end and a distal end, the proximal end being fixed to the rotating body, to allow the wing unit to swing such that the distal end moves approximately in the first direction as the rotating body reciprocates in the rotation direction. The power transmission mechanism further includes a pair of crank arms each configured to connect the rotation transmission member and the slider. The pair of crank arms have one ends that are connected to an eccentric position of the rotation transmission member so as to be rotatable about a common rotation axis as a center of rotation, the common rotation axis extending in a direction parallel with an extending direction of the first rotation axis. The pair of crank arms have the other ends that are separately connected to the slider so as to be rotatable about a corresponding one of separate rotation axes each as a center of rotation, the separate rotation axes extending in the direction parallel with the extending direction of the first rotation axis and being spaced apart from each other in the first direction. Furthermore, the other ends of the pair of crank arms are connected to the slider so as to be slidable in a direction orthogonal to the extending direction of the first rotation axis.

In the wing flapping apparatus according to the first aspect of the present invention, it is preferable that each of the other ends of the pair of crank arms is provided with a hole, and a crank pin is attached to the slider so as to be inserted into the hole, to allow each of the other ends of the pair of crank arms to be rotatably connected to the slider. Also in this case, it is preferable that the crank pin is loosely fitted in the hole, to allow each of the other ends of the pair of crank arms to be connected to the slider so as to be slidable in a direction orthogonal to the extending direction of the first rotation axis.

In the first embodiment of the wing flapping apparatus according to the first aspect of the present invention, the power transmission mechanism may further include an elastic belt partially fixed to the slider, in which a portion of the elastic belt that is not fixed to the slider is wound around the rotating body, to allow the rotating body to reciprocate in the rotation direction as the slider linearly reciprocates.

In the above-described first embodiment, it is preferable that the rotating body is formed of a gear and the elastic belt is formed of a toothed belt configured to engage with the gear.

In the second embodiment of the wing flapping apparatus according to the first aspect of the present invention, the slider and the rotating body may contact each other, to allow the rotating body to reciprocate in the rotation direction as the slider linearly reciprocates.

In the above-described second embodiment, it is preferable that the rotating body is formed of a gear and the slider is formed of a toothed slider configured to engage with the gear.

In the wing flapping apparatus according to the first aspect of the present invention, movement of the slider in the first direction and swinging of the wing unit in the first direction are opposite in direction to each other.

A wing flapping apparatus according to the second aspect of the present invention includes: a frame body; a motive power source installed in the frame body; a first wing unit and a second wing unit; and a power transmission mechanism configured to transmit motive power generated in the motive power source to the first wing unit and the second wing unit. The first wing unit and the second wing unit are configured to be driven by the power transmission mechanism. The power transmission mechanism includes: a rotation transmission member rotatably supported by the frame body, the rotation transmission member being configured to rotate about a first rotation axis as a center of rotation upon reception of the motive power transmitted from the motive power source; a slider movably supported by the frame body, the slider being configured to linearly reciprocate in a first direction upon reception of the motive power transmitted from the rotation transmission member, and a first rotating body and a second rotating body that are rotatably supported by the frame body, each of the first rotating body and the second rotating body being configured to, upon reception of the motive power transmitted from the slider, reciprocate in a corresponding one of a rotation direction about a second rotation axis as a center of rotation and a rotation direction about a third rotation axis as a center of rotation, the second rotation axis and the third rotation axis each extending in a second direction that is orthogonal to the first direction. The first rotating body and the second rotating body are arranged side by side in a third direction that is orthogonal to each of the first direction and the second direction. The first wing unit has a proximal end and a distal end, the proximal end being fixed to the first rotating body such that the distal end is located on a side opposite to a side where the second rotating body is located, when seen from the first rotating body. The second wing unit has a proximal end and a distal end, the proximal end being fixed to the second rotating body such that the distal end is located on a side opposite to a side where the first rotating body is located, when seen from the second rotating body. The first wing unit and the second wing unit are configured to swing such that the distal end of the first wing unit and the distal end of the second wing unit synchronously move approximately in the first direction as the first rotating body reciprocates in the rotation direction about the second rotation axis and the second rotating body reciprocates in the rotation direction about the third rotation axis, respectively. The power transmission mechanism further includes a pair of crank arms each configured to connect the rotation transmission member and the slider. The pair of crank arms have one ends that are connected to an eccentric position of the rotation transmission member so as to be rotatable about a common rotation axis as a center of rotation, the common rotation axis extending in a direction parallel with an extending direction of the first rotation axis. The pair of crank arms have the other ends that are separately connected to the slider so as to be rotatable about a corresponding one of separate rotation axes each as a center of rotation, the separate rotation axes extending in the direction parallel with the extending direction of the first rotation axis and being spaced apart from each other in the first direction. Furthermore, the other ends of the pair of crank arms are connected to the slider so as to be slidable in a direction orthogonal to the extending direction of the first rotation axis.

In the wing flapping apparatus according to the second aspect of the present invention, movement of the slider in the first direction and swinging of each of the first wing unit and the second wing unit in the first direction are opposite in direction to each other.

According to the present invention, a wing flapping apparatus improved in motion efficiency can be provided.

DESCRIPTION OF EMBODIMENTS

Figure 1:
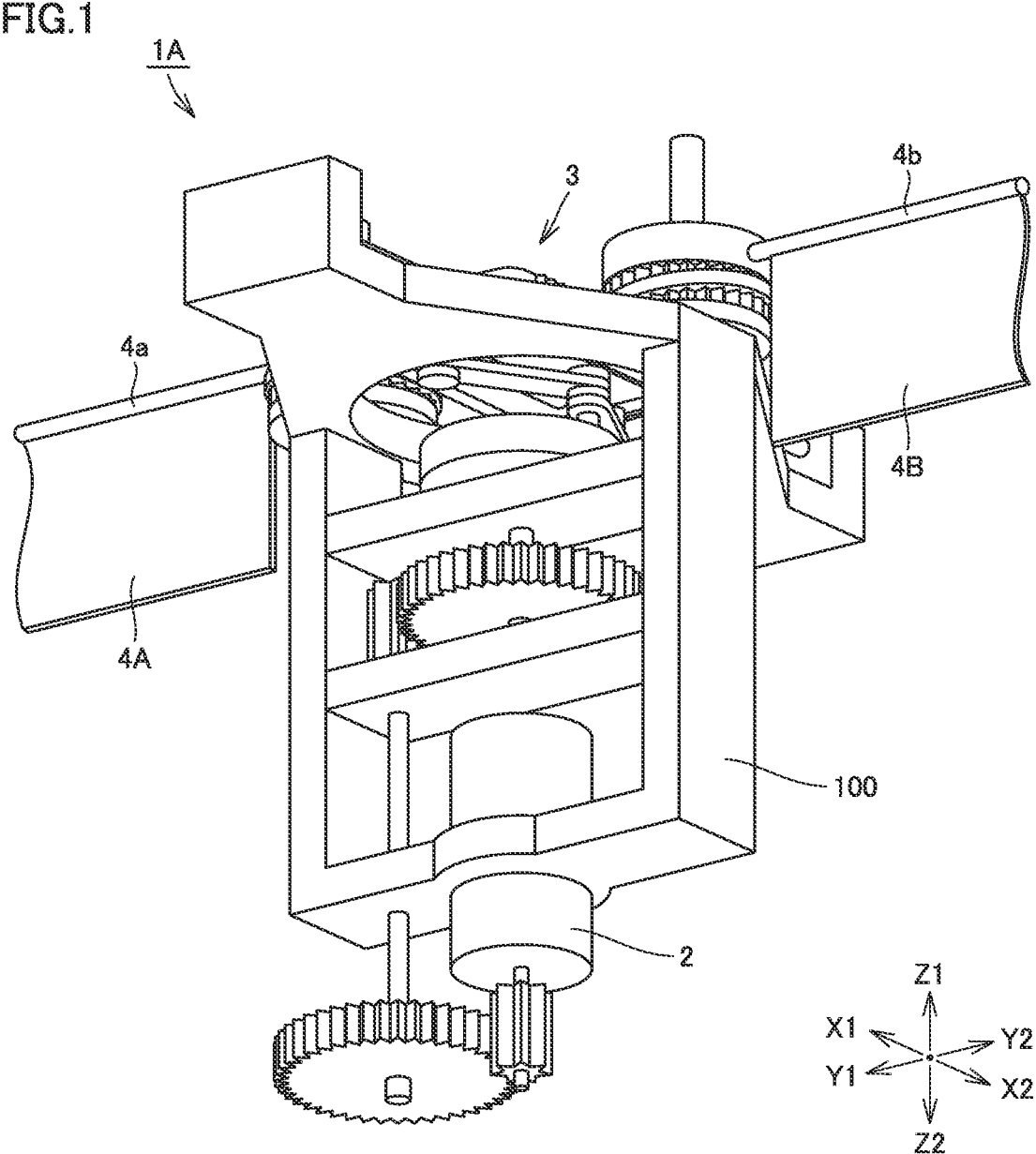
FIG. 1 is a schematic perspective view of a main part of a wing flapping apparatus in accordance with a first embodiment of the present invention.

Embodiments of the present invention will be hereinafter described in detail with reference to the accompanying drawings. In the embodiments described below, the same or corresponding components are designated by the same reference characters, and description thereof will not be repeated.

First Embodiment

Figure 2:
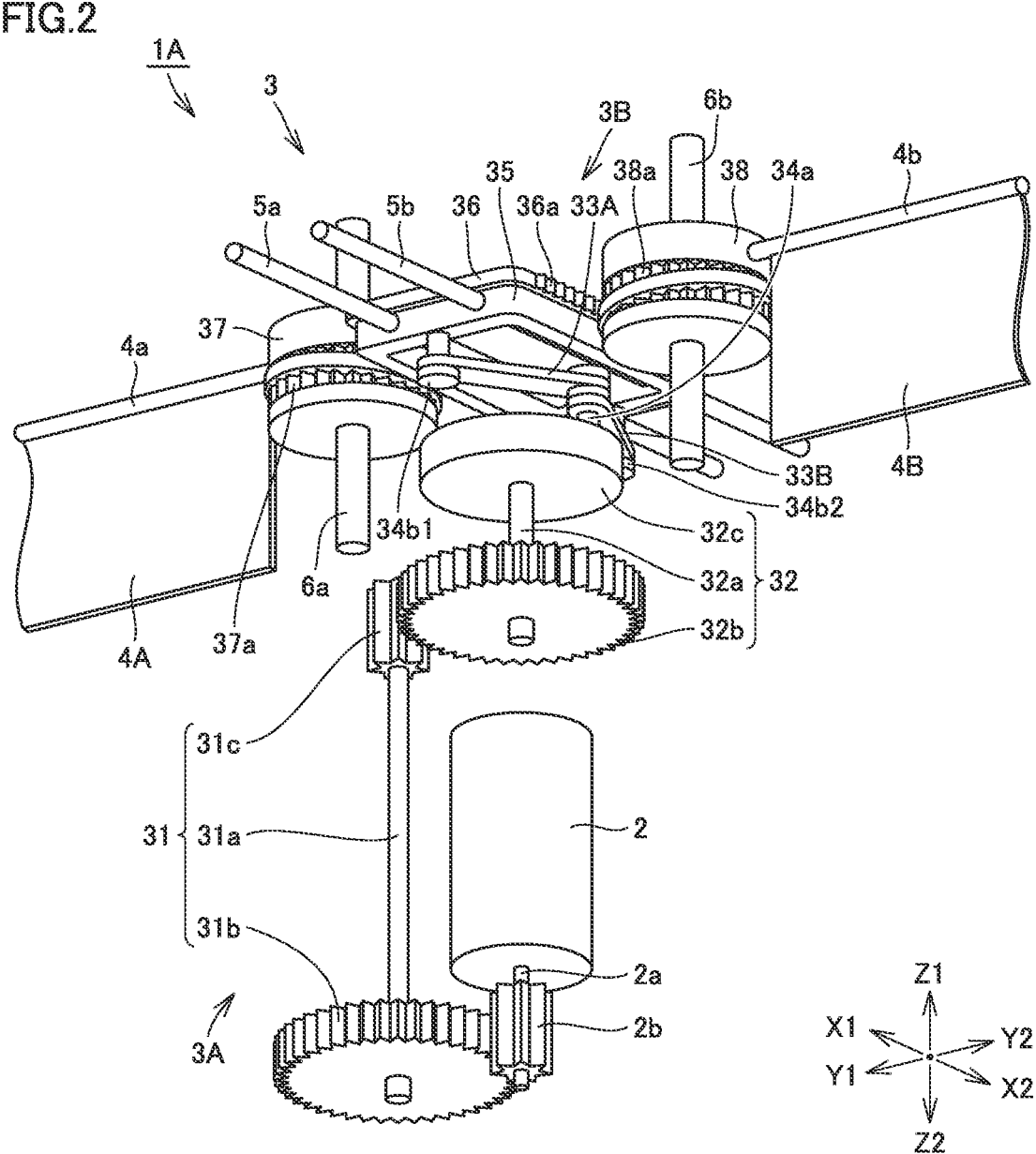
FIG. 2 is a schematic perspective view of a main part of the wing flapping apparatus of the first embodiment of the present invention, absent the frame body.
Figure 3:
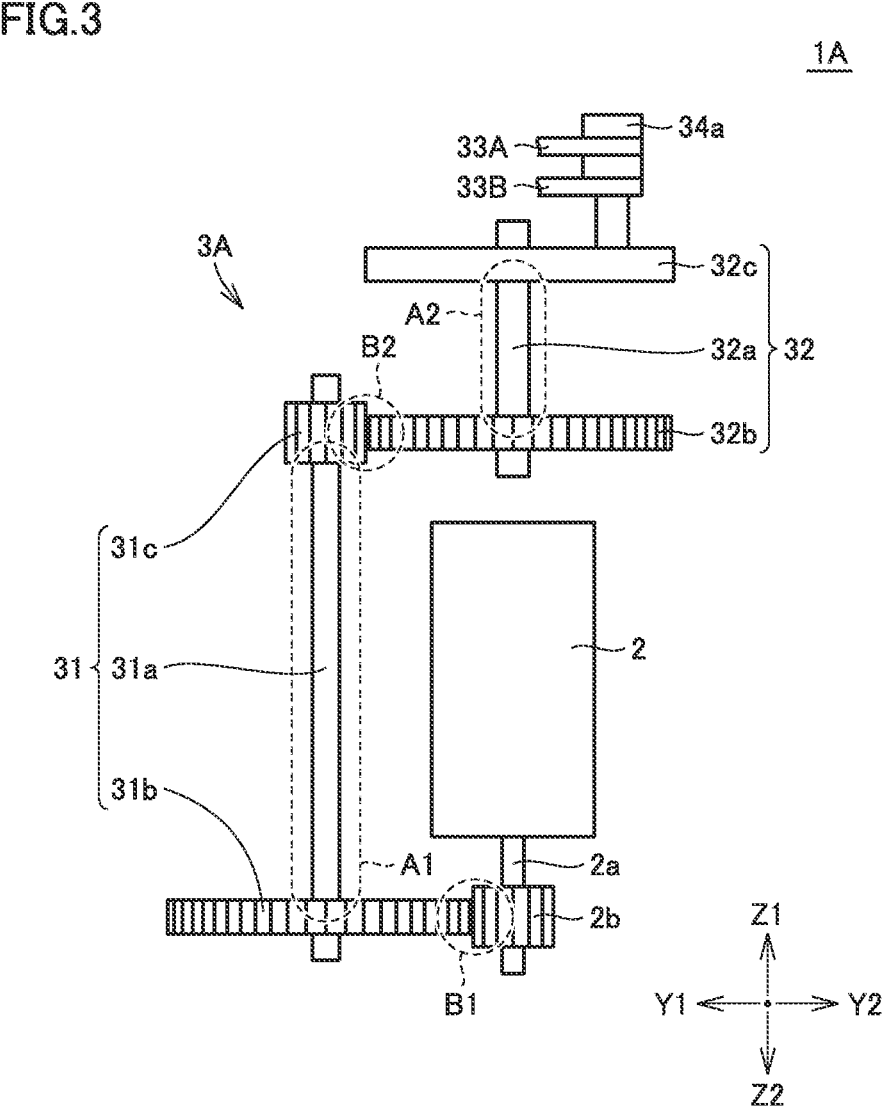
FIG. 3 is a schematic front view for illustrating the configuration and the operation of a rotational motion transmission unit of the wing flapping apparatus of the first embodiment of the present invention.
Figure 4:
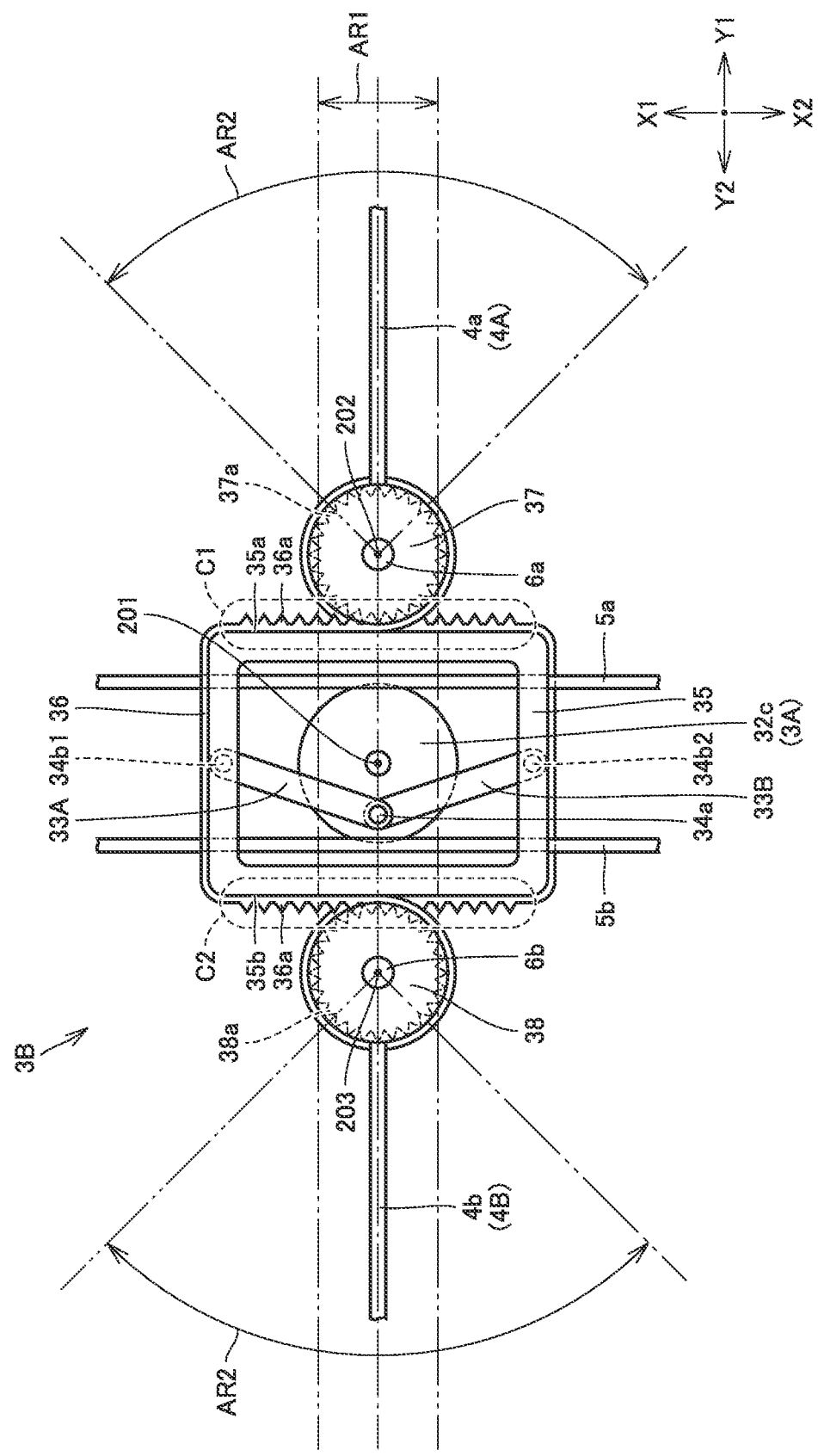
FIG. 4 is a schematic top view for illustrating the configuration and the operation of a motion conversion unit of the wing flapping apparatus of the first embodiment of the present invention.

FIG. 1 is a schematic perspective view of a main part of a wing flapping apparatus in the first embodiment of the present invention. FIG. 2 is a schematic perspective view of this main part without showing a frame body (i.e., the frame body has been removed from the drawing in order to more clearly view the other components of the main part of the wing flapping apparatus). FIG. 3 is a schematic front view for illustrating the configuration and the operation of a rotational motion transmission unit shown in FIG. 2. FIG. 4 is a schematic top view for illustrating the configuration and the operation of the motion conversion unit shown in FIG. 2. Furthermore, FIG. 5 is a diagram showing the attachment structure on the one end side of a pair of crank arms shown in FIG. 2. FIG. 6 is a diagram showing the attachment structure on the other end side of the pair of crank arms shown in FIG. 2. First, referring to FIGS. 1 to 6, the configuration and the schematic operation of a wing flapping apparatus 1A in the present embodiment will be hereinafter described.

As shown in FIG. 1, wing flapping apparatus 1A mainly includes: a frame body 100; a rotary motor 2 as a motive power source installed in frame body 100; a power transmission mechanism 3 configured to transmit motive power generated in rotary motor 2; a first wing unit 4A and a second wing unit 4B serving as a pair of wing units and driven by power transmission mechanism 3; and a battery (not shown) configured to supply electric power to the above-described rotary motor 2. As shown in FIG. 2, power transmission mechanism 3 includes a rotational motion transmission unit 3A and a motion conversion unit 3B.

As shown in FIGS. 1 and 2, the front-rear direction, the right-left direction, and the up-down direction of wing flapping apparatus 1A are defined as an X-axis, a Y-axis, and a Z-axis, respectively. The direction frontward of wing flapping apparatus 1A and the direction rearward of wing flapping apparatus 1A are defined as an X1 direction and an X2 direction, respectively. The direction rightward of wing flapping apparatus 1A and the direction leftward of wing flapping apparatus 1A are defined as a Y1 direction and a Y2 direction, respectively. The direction upward of wing flapping apparatus 1A and the direction downward of wing flapping apparatus 1A are defined as a Z1 direction and a Z2 direction, respectively. The following description will be made based on these axes and directions as defined above.

As shown in FIG. 1, frame body 100 is provided as a member constituting a main body of wing flapping apparatus 1A and formed by installation therein of rotary motor 2, power transmission mechanism 3 and the battery described above. Frame body 100 is formed of a frame-shaped skeletal structure, for example. Frame body 100 may also include a cover for covering the frame-shaped skeletal structure.

As shown in FIGS. 1 to 3, rotary motor 2 is disposed in the lower portion of wing flapping apparatus 1A and installed in frame body 100 as described above. Rotary motor 2 includes an output shaft 2a configured to output rotational motion. Output shaft 2a is formed of a metal-made shaft. Output shaft 2a is disposed to extend in the Z-axis direction and has an end to which a gear 2b is fixed. Gear 2b rotates together with output shaft 2a in accordance with rotation of output shaft 2a about the axis line.

Generally, rotary motor 2 is controlled by a controller (not shown) to which a control instruction is given by a user or an automated algorithm. However, since the details of this control are not directly related to the subject of the present invention, the details will not be described herein for simplification of explanation. Thus, the present embodiment will be described based on the assumption that rotary motor 2 is directly driven by the electric power received from the above-mentioned battery (not shown). Also, the existence or absence of the above-mentioned controller and a specific controlling method employed in the case where a controller is included is not a necessary part of the present invention.

Rotational motion transmission unit 3A includes a first transmission member 31 and a second transmission member 32. Each of first transmission member 31 and second transmission member 32 is rotatably supported by frame body 100.

First transmission member 31 includes a first connection rod 31a extending in the Z-axis direction, a gear 31b fixed to one end of first connection rod 31a, and a gear 31c fixed to the other end of first connection rod 31a. Each of gear 31b and gear 31c rotates, together with first connection rod 31a, about the axis line of first connection rod 31a.

Second transmission member 32 includes a second connection rod 32a extending in the Z-axis direction, a gear 32b fixed to one end of second connection rod 32a, and a disk 32c serving as a rotation transmission member and fixed to the other end of second connection rod 32a. Each of gear 32b and disk 32c rotates, together with second connection rod 32a, about the axis line of second connection rod 32a.

Gear 31b, fixed to one end of first connection rod 31a, engages with gear 2b fixed to the end of output shaft 2a. Furthermore, gear 32b, fixed to one end of second connection rod 32a, engages with gear 31c fixed to the other end of first connection rod 31a.

Thus, the rotational motion produced in output shaft 2a of rotary motor 2 is transmitted, as rotational motion without being changed, to first transmission member 31 and second transmission member 32. Consequently, disk 32c serving as an output unit of rotational motion transmission unit 3A undergoes a rotational motion about the axis line of second connection rod 32a. In other words, disk 32c as a rotation transmission member rotates about a first rotation axis 201 (see FIG. 4) as the center of rotation, which extends in the direction parallel with the extending direction of second connection rod 32a (that is, in the Z-axis direction). Also, by adjusting the number of teeth of each of gears 31b, 31c and 32b, first transmission member 31 and second transmission member 32 are allowed to function as, for example, reduction gears. In the preferred embodiment, each of first connection rod 31a of first transmission member 31 and second connection rod 32a of second transmission member 32 is formed of a rod made of carbon fiber. Thereby, load fluctuation suppression units A1 and A2 described below (see FIG. 3) are constituted by these first connection rod 31a and second connection rod 32a, respectively, which will be described later in detail.

Furthermore, the engagement portion between gear 2b (FIG. 2) of rotary motor 2 and gear 31b of first transmission member 31, and the engagement portion between gear 31c of first transmission member 31 and gear 32b of second transmission member 32 have respective backlashes of prescribed sizes. Thus, load fluctuation suppression units B1 and B2 described later (see FIG. 3) are constituted by their respective engagement portions, which will be described later in detail.

As shown in FIGS. 1, 2 and 4, motion conversion unit 3B is disposed above both rotary motor 2 and rotational motion transmission unit 3A, and mainly includes: a crank formed of a first crank arm 33A, a second crank arm 33B and crank pins 34a, 34b1, 34b2; a slider 35; an elastic belt 36; a first rotating body 37; and a second rotating body 38.

Slider 35 is formed of a rectangular frame-shaped member, and located above second transmission member 32 of rotational motion transmission unit 3A. Slider 35 is movably supported by a pair of slide guides 5a and 5b provided in frame body 100. More specifically, the pair of slide guides 5a and 5b is provided such that slide guides 5a and 5b are arranged side by side in the Y-axis direction so as to extend in the X-axis direction. Slider 35 is provided at its prescribed positions with a plurality of through holes through which slide guides 5a and 5b are inserted. Thus, slider 35 is configured to be movable in the X-axis direction corresponding to the first direction by slide guides 5a and 5b inserted through the plurality of through holes.

First crank arm 33A and second crank arm 33B operate as paired crank arms and are disposed below slider 35 and above second transmission member 32. First crank arm 33A and second crank arm 33B each are disposed so as to extend in the direction parallel with an X-Y plane.

Referring to FIG. 4, first crank arm 33A has one end that is rotatably attached by crank pin 34a at the eccentric position of disk 32c of second transmission member 32 and the other end that is rotatably attached by crank pin 34b1 at the front end position of slider 35.

Figure 5A:
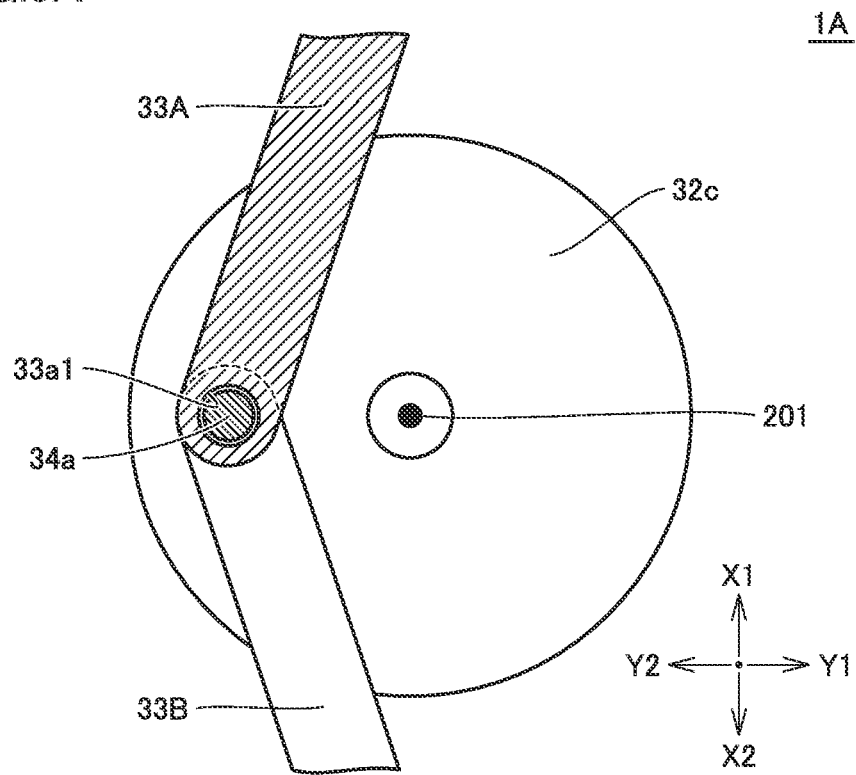
FIGS. 5A and 5B are diagrams showing the attachment structure on the one end side of a pair of crank arms in the wing flapping apparatus of the first embodiment of the present invention.

More specifically, as shown in FIG. 5A, the one end of first crank arm 33A is provided with a hole 33a1. Crank pin 34a is attached to disk 32c so as to be inserted into this hole 33a1. The hole 33a1 is formed to be slightly larger than the portion of crank pin 34a that is inserted into hole 33a1 by a prescribed clearance enough to reduce friction, such that the one end of first crank arm 33A is rotatably attached to disk 32c.

Figure 6A:
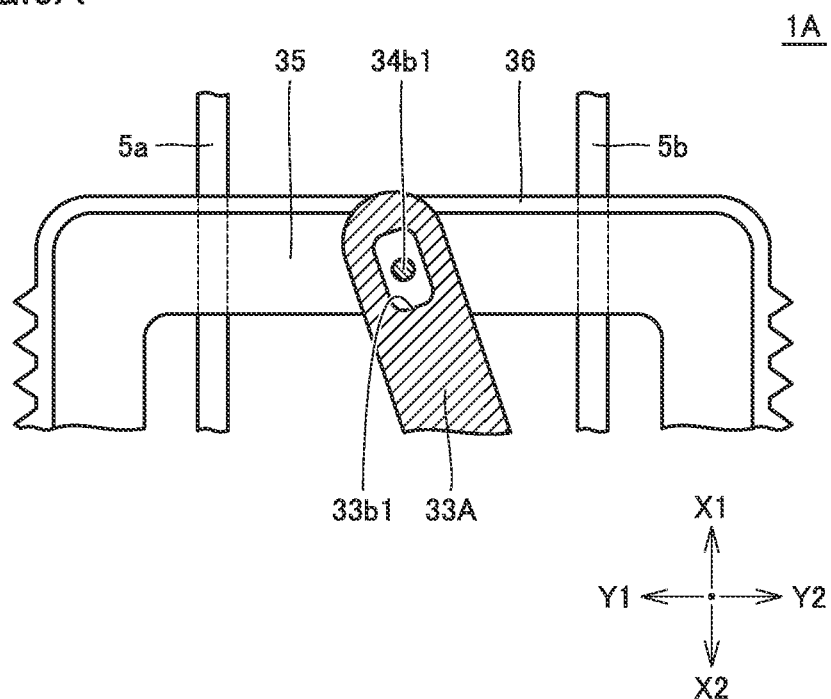
FIGS. 6A and 6B are diagrams showing the attachment structure on the other end side of the pair of crank arms in the wing flapping apparatus of the first embodiment of the present invention.

On the other hand, as shown in FIG. 6A, the other end of first crank arm 33A is provided with hole 33b1. Crank pin 34b1 is attached to the front end position of slider 35 so as to be inserted into hole 33b1. In this case, hole 33b1 is formed to be remarkably larger than the outer shape of the portion of crank pin 34b1 that is inserted into hole 33b1 (that is, sufficiently larger than this portion by a prescribed clearance that is enough to reduce friction) at least in the direction in which first crank arm 33A extends. For example, hole 33b1 may be formed of a long hole as shown in the figure. Thereby, crank pin 34b1 is loosely fitted in hole 34b1.

Thus, the other end of first crank arm 33A is not only rotatably attached to slider 35, but also attached to slider 35 so as to be slidable in the X-Y in-plane direction.

Referring again to FIG. 4, second crank arm 33B has one end rotatably attached by crank pin 34a to the eccentric position of disk 32c of second transmission member 32 and the other end rotatably attached by crank pin 34b2 to the rear end position of slider 35.

Figure 5B:
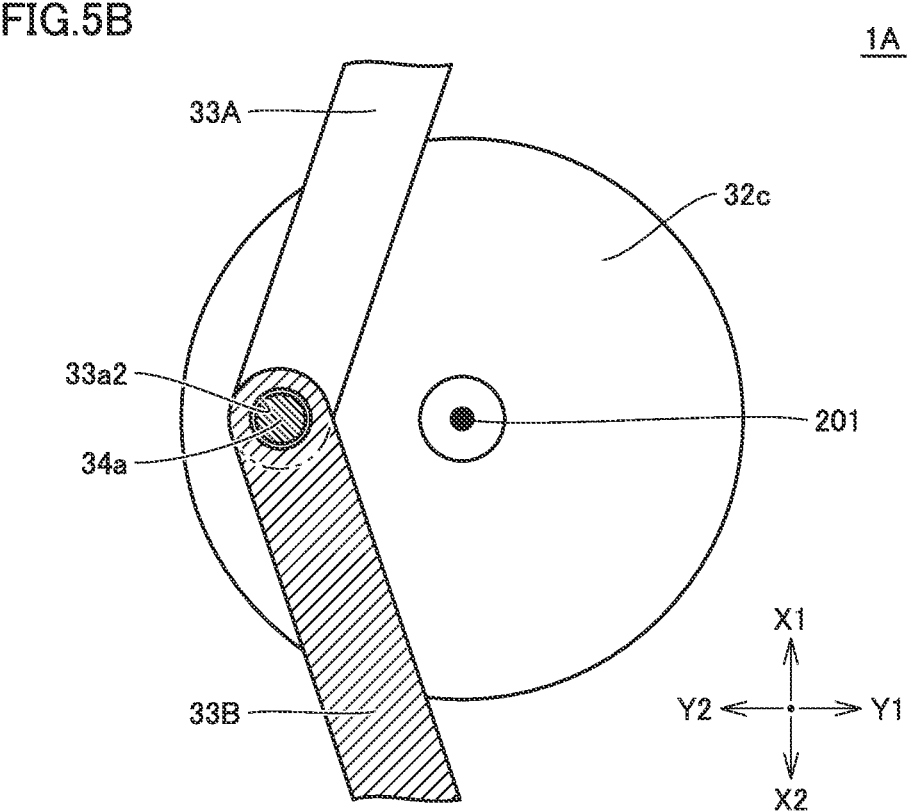

More specifically, as shown in FIG. 5B, the one end of second crank arm 33B is provided with a hole 33a2. Crank pin 34a is attached to disk 32c so as to be inserted into this hole 33a2. In this case, hole 33a2 is formed to be slightly larger than the portion of crank pin 34a that is inserted into hole 33a2 by a prescribed clearance enough to reduce friction such that the one end of second crank arm 33B is rotatably attached to disk 32c.

Figure 6B:
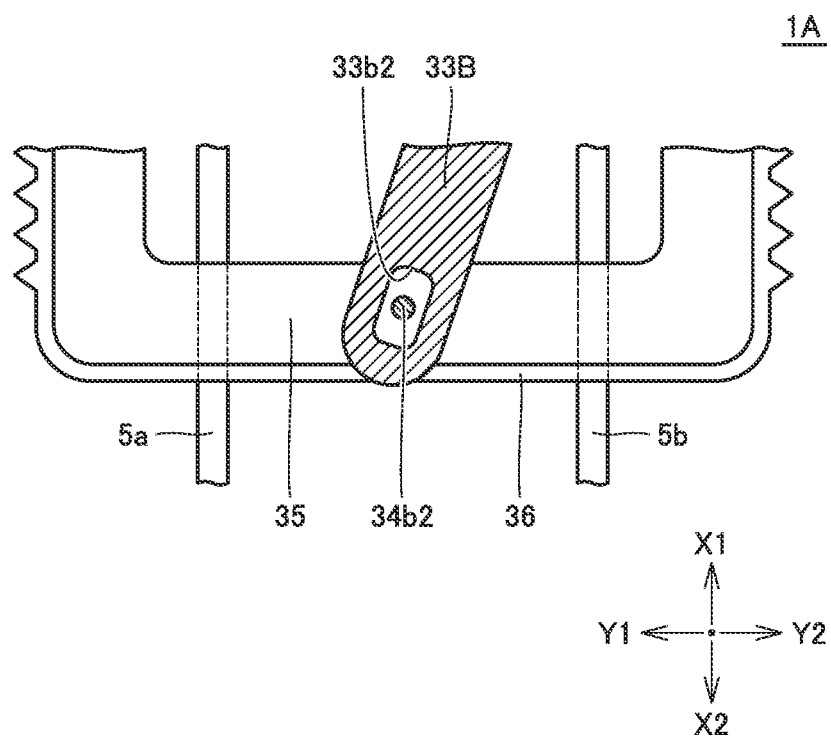

On the other hand, as shown in FIG. 6B, the other end of second crank arm 33B is provided with a hole 33b2. Crank pin 34b2 is attached to the rear end position of slider 35 so as to be inserted into hole 33b2. In this case, hole 33b2 is formed to be remarkably larger than the outer shape of the portion of crank pin 34b2 that is inserted into hole 33b2 (that is, sufficiently larger than the above-mentioned outer shape by a prescribed clearance enough to reduce friction) at least in the direction in which first crank arm 33B extends. For example, hole 33b2 may be formed of a long hole as shown in the figure. Thereby, crank pin 34b2 is loosely fitted in hole 33b2.

Thus, the other end of second crank arm 33B is not only rotatably attached to slider 35, but also attached to slider 35 so as to be slidable in the X-Y in-plane direction.

As described above, the one end of first crank arm 33A and the one end of second crank arm 33B are rotatably attached by common crank pin 34a to disk 32c. Thus, the one end of first crank arm 33A and the one end of second crank arm 33B each are rotatably connected to the eccentric position of disk 32c about the common rotation axis as the center of rotation, the common rotation axis extending in the direction parallel with the extending direction of first rotation axis 201 of disk 32c that serves as a rotation transmission member.

On the other hand, as described above, the other end of first crank arm 33A and the other end of second crank arm 33B are rotatably and slidably attached to slider 35 by separate crank pins 34b1 and 34b2, respectively. Accordingly, the other end of first crank arm 33A and the other end of second crank arm 33B are separately connected to the slider so as to be rotatable about separate rotation axes each as the center of rotation. These separate rotation axes extend in the direction parallel with the extending direction of first rotation axis 201 of disk 32c serving as a rotation transmission member and also are spaced apart from each other in the X-axis direction corresponding to the direction in which slider 35 moves. Also, the other end of first crank arm 33A and the other end of second crank arm 33B are connected to slider 35 so as to be slidable in the direction that is orthogonal to the extending direction of first rotation axis 201 of disk 32c serving as a rotation transmission member.

Thereby, as shown in FIG. 4, disk 32c as an output unit of rotational motion transmission unit 3A undergoes a rotational motion about first rotation axis 201 as the center of rotation, so that the one ends of first crank arm 33A and second crank arm 33B attached at disk 32c (that is, the end of each crank arm on the side where crank pin 34a is located) each also rotate about first rotation axis 201 as the center of rotation. Accordingly, slider 35 is periodically pushed and pulled by first crank arm 33A and second crank arm 33B, so that slider 35 linearly reciprocates in the X-axis direction corresponding to the direction in which slide guides 5a and 5b extend. In FIG. 4, the range in which the position of the center of gravity of slider 35 moves during linear reciprocation of slider 35 is indicated by an arrow AR1.

As shown in FIGS. 2 and 4, first rotating body 37 and second rotating body 38 are arranged on the right side and the left side, respectively, of slider 35. More specifically, first rotating body 37 and second rotating body 38 are arranged side by side with slider 35 interposed therebetween in the Y-axis direction corresponding to the third direction. First rotating body 37 and second rotating body 38 each are formed of an approximately columnar-shaped member, and are arranged such that their respective circumferential surfaces face slider 35.

More specifically, first rotating body 37 is fixed to a guide shaft 6a provided in frame body 100 and extending in the Z-axis direction. Guide shaft 6a is rotatably supported by frame body 100. Thereby, as shown in FIG. 4, on the right side surface 35a of slider 35, first rotating body 37 is positioned rotatably about a second rotation axis 202 as the center of rotation, which extends in the Z-axis direction corresponding to the second direction.

Furthermore, second rotating body 38 is fixed to a guide shaft 6b provided in frame body 100 and extending in the Z-axis direction. Guide shaft 6b is rotatably supported by frame body 100. Thereby, as shown in FIG. 4, on the left side surface 35b of slider 35, second rotating body 38 is positioned rotatably about a third rotation axis 203 as the center of rotation, which extends in the Z-axis direction corresponding to the second direction.

The circumferential outer surfaces of the first and second rotating bodies 37 and 38 that face slider 35 are provided with a gear groove that extends around each respective circumferential surface. The gear grooves are provided with teeth 37a and 38a which respectively allow first rotating body 37 and second rotating body 38 to function as gears.

An elastic belt 36 is wound around the outer circumferential surface of slider 35, the outer circumferential surface of first rotating body 37 and the outer circumferential surface of second rotating body 38. Elastic belt 36 is formed of a toothed belt having main surfaces, one of which is provided at its prescribed position with teeth 36a. Elastic belt 36 may be formed of any material as long as the material has elasticity, but is preferably formed of resin or rubber. In addition, elastic belt 36 needs to be designed based on the purpose of suppressing load fluctuation described below.

The portion of elastic belt 36 that is wound around the outer circumferential surface of slider 35 is fixed to slider 35 in an area of the outer circumferential surface of slider 35 excluding right side surface 35a and left side surface 35b as described above. Furthermore, the above-mentioned teeth 36a face outward in a portion of elastic belt 36 that is wound around the outer circumferential surface of slider 35.

The portions of elastic belt 36 that are wound around the outer circumferential surface of slider 35 and the outer circumferential surface of first rotating body 37 are wound around slider 35 and first rotating body 37 so as to extend to form a figure of "8". In this case, in the portion of elastic belt 36 that is wound around the outer circumferential surface of first rotating body 37, teeth 36a face inward and engage with teeth 37a on the gear groove provided on the circumferential surface of first rotating body 37.

Furthermore, the portions of elastic belt 36 that are wound around the outer circumferential surface of slider 35 and the outer circumferential surface of second rotating body 38 are wound around slider 35 and second rotating body 38 so as to extend to form a figure of "8". In this case, in the portion of elastic belt 36 that is wound around the outer circumferential surface of second rotating body 38, teeth 36a face inward and engage with teeth 38a of the gear groove provided on the circumferential surface of second rotating body 38.

Accordingly, on the side of right side surface 35a of slider 35, the portion of elastic belt 36 that is not fixed to (i.e., is not touching the slider 35) is wound around first rotating body 37. Also, on the side of left side surface 35b of slider 35, the portion of elastic belt 36 that is not fixed to (i.e., is not touching the slider 35) is wound around second rotating body 38.

Thus, as slider 35 linearly reciprocates in the X-axis direction as described above, the portions of elastic belt 36 that are wound around first and second rotating bodies 37 and 38 are fed in their respective rotation directions of first rotating body 37 and second rotating body 38. This causes the first and second rotating bodies 37 and 38 to reciprocate in their respective rotation directions about the second and third rotation axes 202 and 203, respectively, each as the center of rotation. In this case, the rotation direction (i.e., clockwise or counterclockwise) of first rotating body 37 and the rotation direction of second rotating body 38 are opposite to each other at all times.

Thus, in motion conversion unit 3B, the rotational motion transmitted through rotational motion transmission unit 3A is converted into a reciprocating motion, so that first rotating body 37 and second rotating body 38 each as an output unit of motion conversion unit 3B synchronously reciprocate in their respective rotation directions.

In this case, as described above, transmission of the motion between slider 35 and each of first rotating body 37 and second rotating body 38 is implemented by elastic belt 36. Thereby, the elastic belt 36 forms two load fluctuation suppression units C1 and C2 which are described in detail below with reference to FIG. 4.

As shown in FIGS. 2 and 4, first and second wing units 4A and 4B are attached to first and second rotating bodies 37 and 38, respectively. More specifically, at a prescribed position on the outer circumferential surface of first rotating body 37 on the side opposite to the side where slider 35 is located, the proximal end as one end of a mast 4a of first wing unit 4A is fixed. Also, at a prescribed position on the circumferential surface of second rotating body 38 on the side opposite to the side where slider 35 is located, the proximal end as one end of a mast 4b of second wing unit 4B is fixed.

Thereby, on the starboard side of wing flapping apparatus 1A, first wing unit 4A extends in the Y1 direction such that its distal end is located on the side opposite to the side where second rotating body 38 is located, when seen from first rotating body 37. Also, on the port side of wing flapping apparatus 1A, second wing unit 4B extends in the Y2 direction such that its distal end is located on the side opposite to the side where first rotating body 37 is located, when seen from second rotating body 38.

Thus, as shown in FIG. 4, first rotating body 37 and second rotating body 38 each as an output unit of motion conversion unit 3B synchronously reciprocate in their respective rotation directions about first rotation axis 201 and second rotation axis 202, respectively, each as the center of rotation, so that first wing unit 4A and second wing unit 4B are driven by first rotating body 37 and second rotating body 38, respectively, so as to synchronously swing.

In this case, first wing unit 4A and second wing unit 4B also synchronously reciprocate in their respective rotation directions about the above-described first rotation axis 201 and second rotation axis 202, respectively, each as the center of rotation. Accordingly, first wing unit 4A and second wing unit 4B synchronously swing such that their respective distal ends move approximately in the X-axis direction corresponding to the first direction. In FIG. 4, the range in which each of first wing unit 4A and second wing unit 4B swings is indicated by an arrow AR2.

As described above, wing flapping apparatus 1A in the present embodiment is configured as follows. Specifically, the rotational motion generated by rotary motor 2 as a driving source is converted into a reciprocating motion when it is transmitted by power transmission mechanism 3. Then, upon reception of the transmitted reciprocating motion, first wing unit 4A and second wing unit 4B swing. Thereby, first wing unit 4A and second wing unit 4B synchronously swing, so that wing flapping apparatus 1A continuously flaps, thereby achieving a levitation force.

In this case, as described above, in wing flapping apparatus 1A in the present embodiment, during the operation, first rotating body 37 and second rotating body 38 reciprocate in their respective rotation directions, thereby not only causing first wing unit 4A and second wing unit 4B to swing, but also causing slider 35 to linearly reciprocate. In this case, linear reciprocation of slider 35 and swinging of each of first wing unit 4A and second wing unit 4B are opposite in direction to each other at all times, which will be hereinafter described in detail.

FIGS. 7 to 10 each are a schematic top view for illustrating details of the operation of the motion conversion unit of the wing flapping apparatus in the above-described present embodiment. In this case, FIGS. 7 to 10 are diagrams showing in chronological order how slider 35, first wing unit 4A and second wing unit 4B move in one cycle of the synchronous flapping operation of first wing unit 4A and second wing unit 4B, starting from the state shown in FIG. 4.

In the state shown in FIG. 4, slider 35 is located approximately at the center position within the range in which slider 35 can linearly reciprocate. In this case, first wing unit 4A and second wing unit 4B are located at the position of three o'clock and nine o'clock, respectively. Also, when first wing unit 4A and second wing unit 4B are seen from above in the Z2 direction, the first and second wing units 4A and 4B are located on the same straight line. In this case, a one end of each of first crank arm 33A and second crank arm 33B attached to disk 32c serving as a connection portion between rotational motion transmission unit 3A and motion conversion unit 3B (that is, the end of each crank arm on the side where pin 34a is located) is located at the position of nine o'clock.

Figure 7:
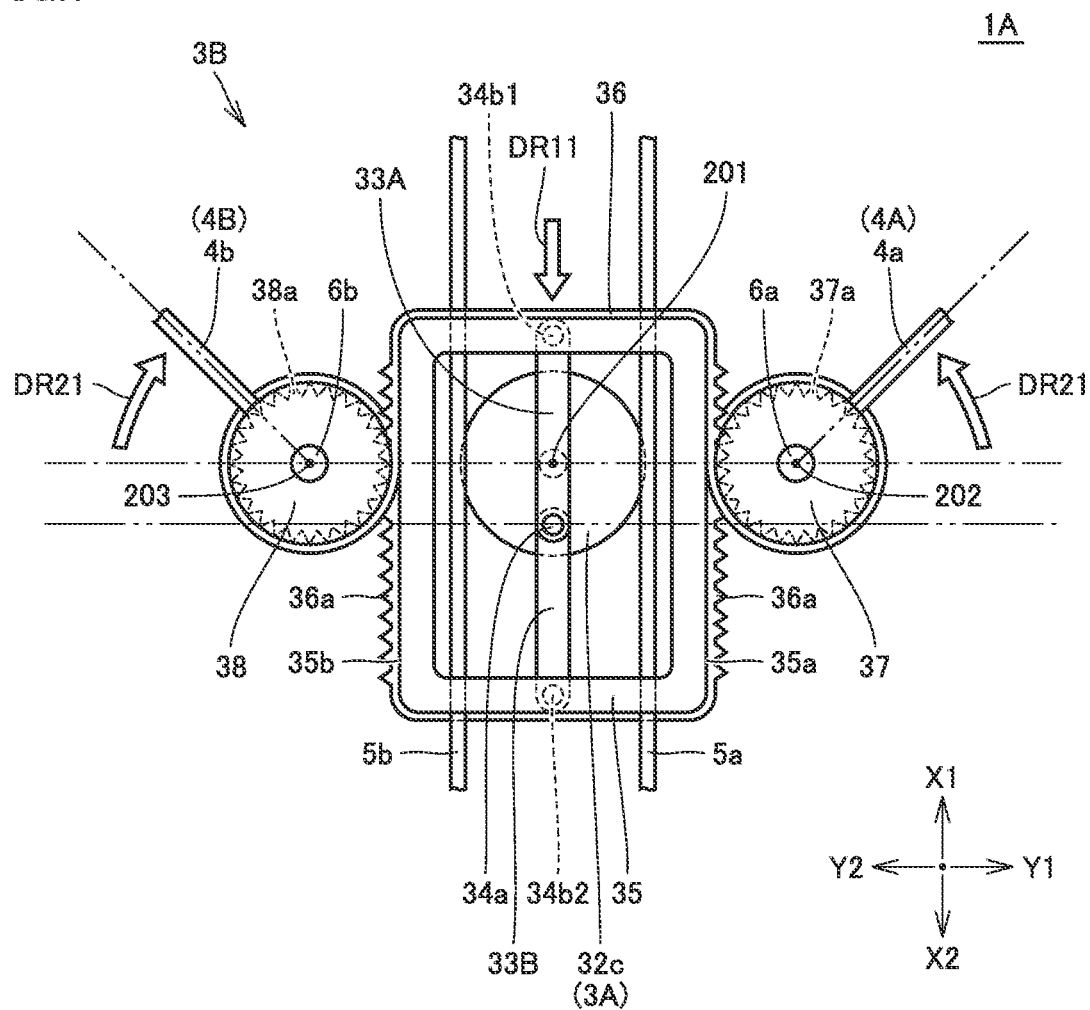
FIG. 7 is a schematic top view for illustrating details of the operation of the motion conversion unit of the wing flapping apparatus of the first embodiment of the present invention.

First, as shown in FIG. 7, upon reception of the motive power transmitted from rotary motor 2, disk 32c rotates from the state shown in FIG. 4 by 90° in a counter-clockwise direction. Then, the above-mentioned connection portion reaches the position of six o'clock from the position of nine o'clock, during which slider 35 moves in a DR11 direction shown in the figure, which causes the position of the center of gravity of slider 35 also to move in the X2 direction.

Also in this case, first wing unit 4A and second wing unit 4B are moved in a DR21 direction shown in the figure (that is, toward the position of twelve o'clock) in accordance with the counter-clockwise rotation of first rotating body 37 and the clockwise rotation of second rotating body 38, respectively. Such movements occur approximately in the X1 direction.

Accordingly, during such movements, the moving direction of slider 35 and the moving direction of each of first wing unit 4A and second wing unit 4B are opposite to each other approximately in the X-axis direction. Thus, the position of the center of gravity of slider 35 moves backward in the X2 direction, so that slider 35 acts as a counterweight. Thereby, the acceleration caused by the movement of each of first wing unit 4A and second wing unit 4B in the X1 direction is opposite in direction to the acceleration caused by the movement of slider 35 in the X2 direction, with the result that the inertial forces are counteracted.

Figure 8:
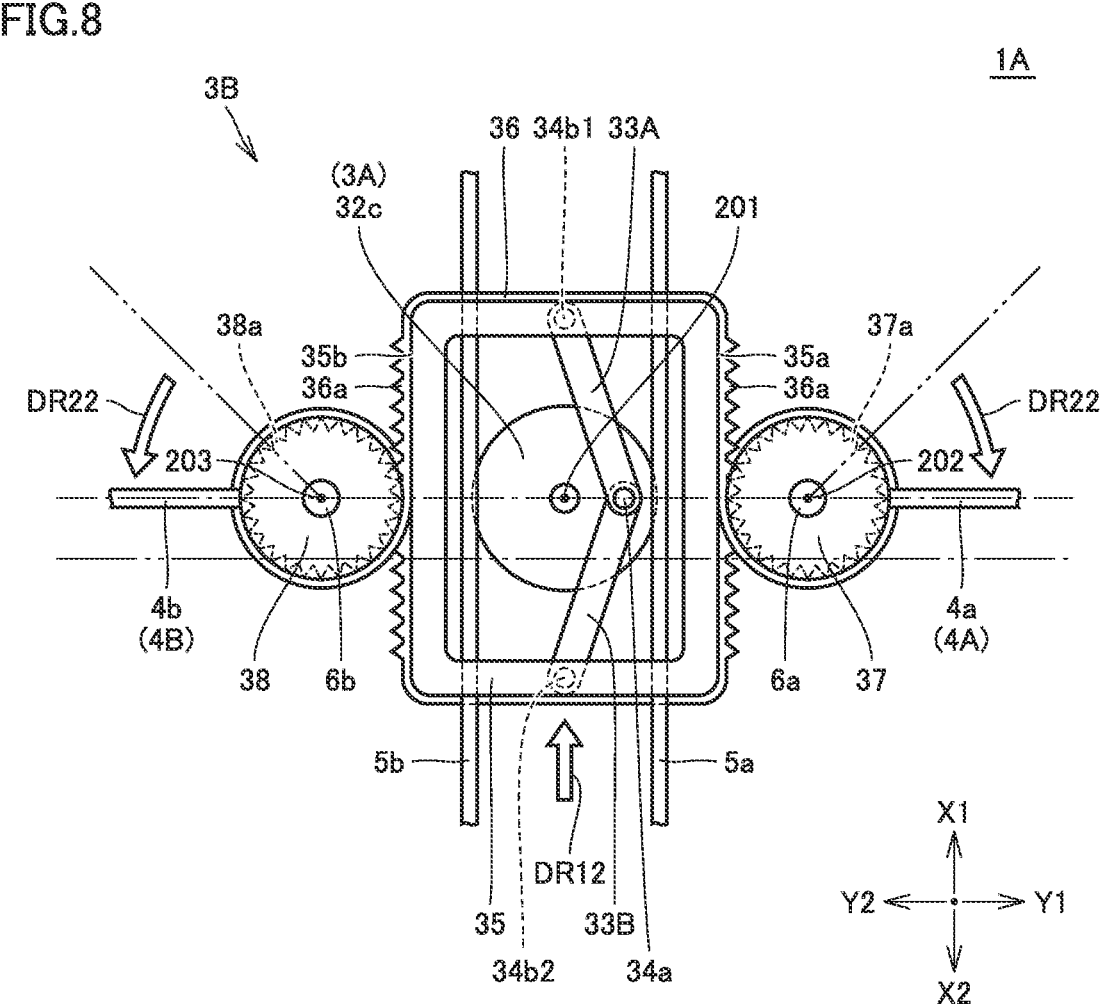
FIG. 8 is a schematic top view for illustrating details of the operation of the motion conversion unit of the wing flapping apparatus of the first embodiment of the present invention.

Then, as shown in FIG. 8, upon reception of the motive power transmitted from rotary motor 2, disk 32c further rotates from the state shown in FIG. 7 by 90° in the counter-clockwise direction. Thereby, the above-mentioned connection portion reaches the position of three o'clock from the position of six o'clock, during which slider 35 moves in a DR12 direction shown in the figure, which causes the position of the center of gravity of slider 35 also to move in the X1 direction.

Also in this case, first wing unit 4A and second wing unit 4B are moved in a DR22 direction shown in the figure (that is, toward the position of three o'clock and the position of nine o'clock, respectively) in accordance with the clockwise rotation of first rotating body 37 and the counter-clockwise rotation of second rotating body 38, respectively. Such movements occur approximately in the X2 direction.

Accordingly, also during such movements, the moving direction of slider 35 and the moving direction of each of first wing unit 4A and second wing unit 4B are opposite to each other approximately in the X-axis direction. Thus, the position of the center of gravity of slider 35 moves forward in the X1 direction, so that slider 35 acts as a counterweight. Thereby, the acceleration caused by the movement of each of first wing unit 4A and second wing unit 4B in the X2 direction is opposite in direction to the acceleration caused by the movement of slider 35 in the X1 direction, with the result that the inertial force is counteracted.

Figure 9:
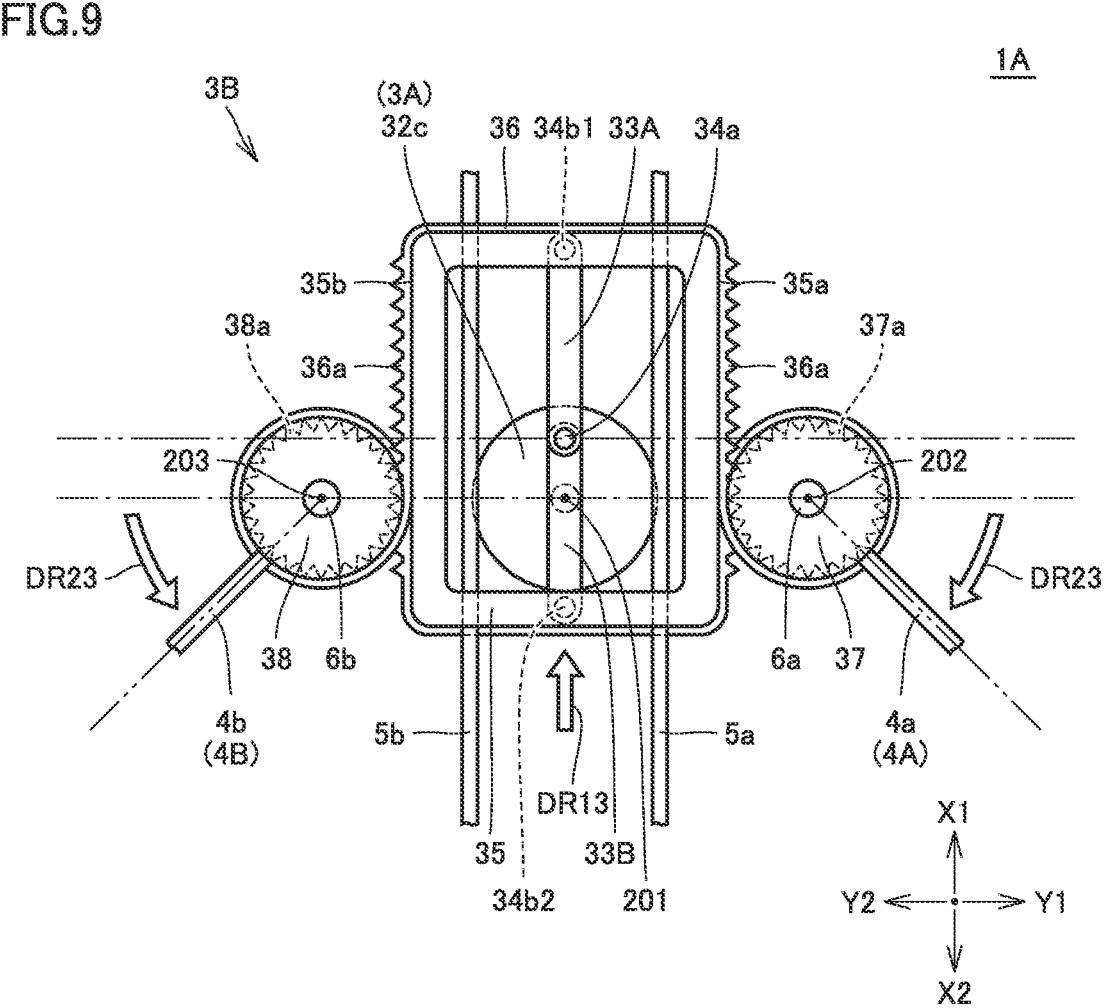
FIG. 9 is a schematic top view for illustrating details of the operation of the motion conversion unit of the wing flapping apparatus of the first embodiment of the present invention.

Then, as shown in FIG. 9, upon reception of the motive power transmitted from rotary motor 2, disk 32c further rotates from the state shown in FIG. 8 by 90° in the counter-clockwise direction. Then, the above-mentioned connection portion reaches the position of twelve o'clock from the position of three o'clock, during which slider 35 moves in a DR13 direction shown in the figure, which causes the position of the center of gravity of slider 35 also to move in the X1 direction.

Also in this case, first wing unit 4A and second wing unit 4B are moved in a DR23 direction shown in the figure (that is, toward the position of six o'clock) in accordance with the clockwise rotation of first rotating body 37 and the counter-clockwise rotation of second rotating body 38, respectively. Such movements occur approximately in the X2 direction.

Accordingly, also during such movements, the moving direction of slider 35 and the moving direction of each of first wing unit 4A and second wing unit 4B are opposite to each other approximately in the X-axis direction. Thus, the position of the center of gravity of slider 35 moves forward in the X1 direction, so that slider 35 acts as a counterweight. Thereby, the acceleration caused in accordance with the movement of each of first wing unit 4A and second wing unit 4B in the X2 direction is opposite in direction to the acceleration caused in accordance with the movement of slider 35 in the X1 direction, with the result that the inertial force is counteracted.

Figure 10:
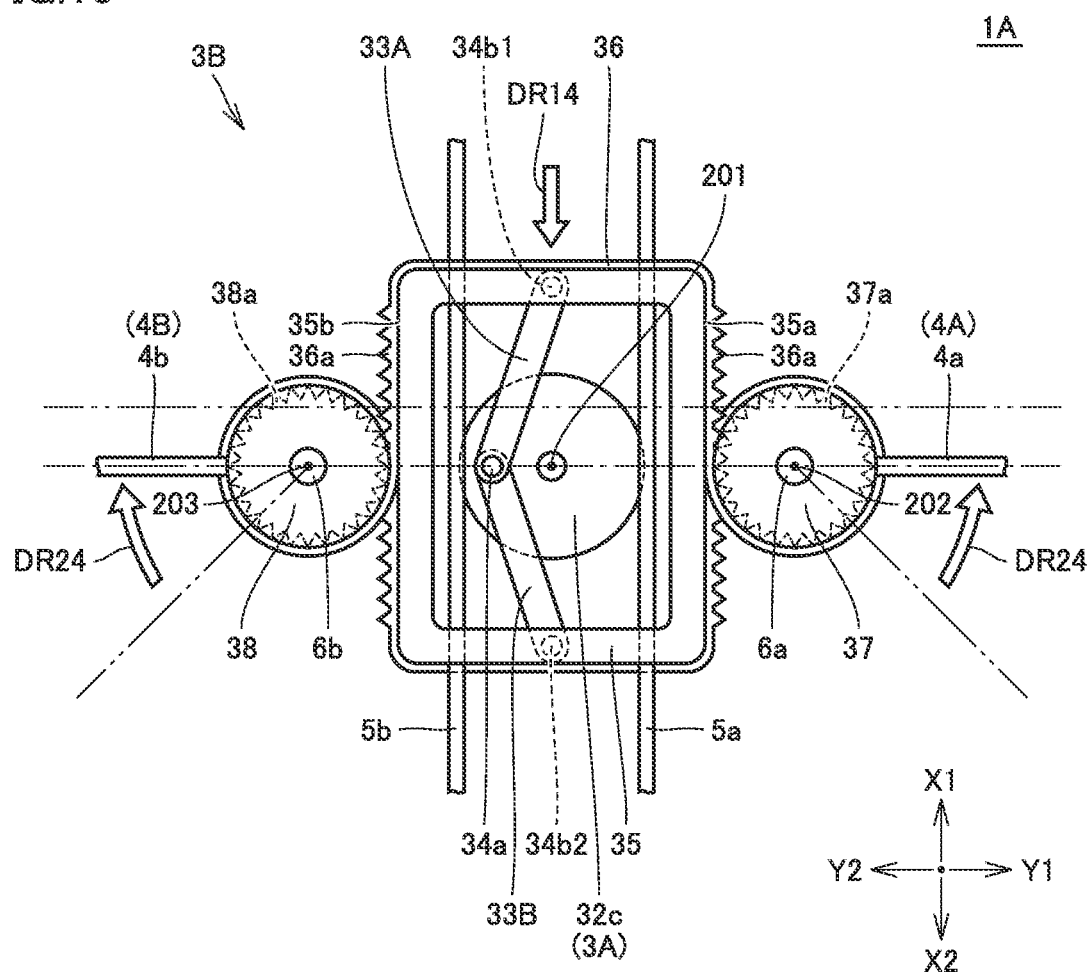
FIG. 10 is a schematic top view for illustrating details of the operation of the motion conversion unit of the wing flapping apparatus of the first embodiment of the present invention.

Then, as shown in FIG. 10, upon reception of the motive power transmitted from rotary motor 2, disk 32c further rotates from the state shown in FIG. 9 by 90° in the counter-clockwise direction. Then, the above-mentioned connection portion reaches the position of three o'clock from the position of twelve o'clock, during which slider 35 moves in a DR14 direction shown in the figure, which causes the position of the center of gravity of slider 35 also to move in the X2 direction.

Also in this case, first wing unit 4A and second wing unit 4B are moved in a DR24 direction shown in the figure (that is, toward the position of three o'clock and the position of nine o'clock, respectively) in accordance with the counterclockwise rotation of first rotating body 37 and the clockwise rotation of second rotating body 38, respectively. Such movements occur approximately in the X1 direction.

Accordingly, also during such movements, the moving direction of slider 35 and the moving direction of each of first wing unit 4A and second wing unit 4B are opposite to each other approximately in the X-axis direction. Thus, the position of the center of gravity of slider 35 moves backward in the X2 direction, so that slider 35 acts as a counterweight. Thereby, the acceleration caused in accordance with the movement of each of first wing unit 4A and second wing unit 4B in the X1 direction is opposite in direction to the acceleration caused in accordance with the movement of slider 35 in the X2 direction, with the result that the inertial force is counteracted.

As described above, in wing flapping apparatus 1A in the present embodiment, during the operation, linear reciprocation of slider 35 and swinging of each of first wing unit 4A and second wing unit 4B are opposite in direction to each other at all times.

Accordingly, slider 35 acts as a counterweight, so that the inertial force caused by swinging of first wing unit 4A and second wing unit 4B is counteracted at all times, thereby suppressing occurrence of periodical vibrations in frame body 100, with the result that the attitude of wing flapping apparatus 1A is stabilized.

Also, at the same time, first wing unit 4A and second wing unit 4B smoothly swing, so that fluctuations of the load applied to output shaft 2a of rotary motor 2 as a motive power source can be significantly suppressed.

Accordingly, when slider 35 is configured to act as a counter weight as described above, the motion efficiency is significantly improved as compared with the conventional case, so that a wing flapping apparatus excellent in flight ability can be achieved.

In this case, in the present embodiment, as described above, the crank mechanism configured to connect disk 32c serving as a rotation transmission member and slider 35 is not formed as a commonly-used crank mechanism functioning using one crank arm, but formed as a crank mechanism functioning using a pair of (that is, two) crank arms (that is, first crank arm 33A and second crank arm 33B). Furthermore, the ends of the paired crank arms (that is, the above-mentioned other ends of first crank arm 33A and second crank arm 33B) are not only rotatably connected to slider 35 but also slidably connected to slider 35. By the configuration as described above, it becomes possible to achieve the effect of significantly improving the motion efficiency as compared with the conventional case. The reason why such the effect can be achieved will be hereinafter described in detail.

Figure 11:
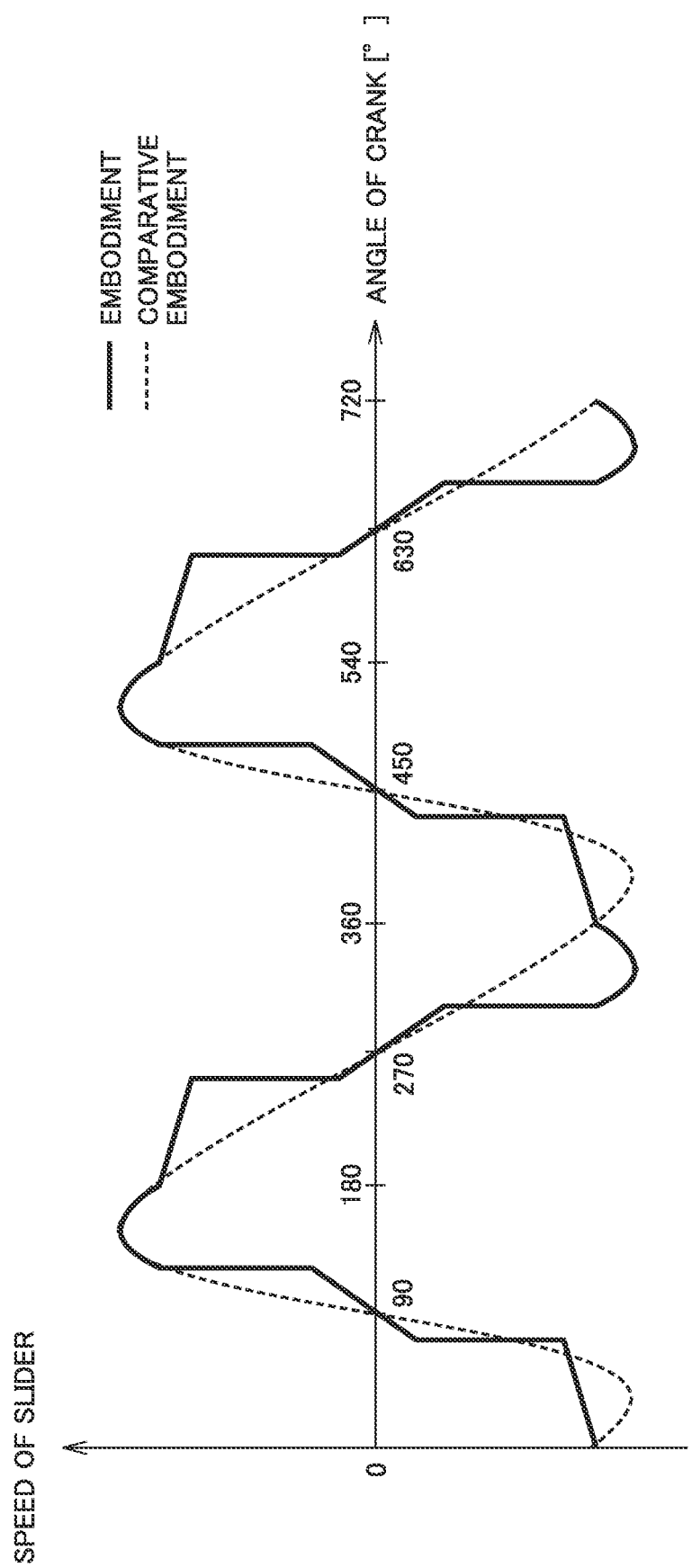
FIG. 11 is a schematic graph showing a comparison of the slider's speed change between the wing flapping apparatus of the first embodiment of the present invention and the wing flapping apparatus according to a comparative embodiment.

FIG. 11 is a schematic graph showing a comparison of the slider's speed change between the wing flapping apparatus in the present embodiment and the wing flapping apparatus according to a comparative embodiment. In the graph shown in FIG. 11, the horizontal axis shows the rotation angle of the crank while the vertical axis shows the speed of the slider. In addition, since the first wing unit and the second wing unit each are driven almost directly by movement of the slider, the speed of the slider may be essentially regarded as the speed of each of the first wing unit and the second wing unit.

In this case, the wing flapping apparatus according to the comparative embodiment has a configuration in which a disk and a slider are connected using one commonly-used crank arm as described above, which is different from wing flapping apparatus 1A in the present embodiment that has a configuration of the crank mechanism configured to connect a disk and a slider.

Specifically, in the wing flapping apparatus according to the comparative embodiment, the above-described second crank arm is not provided and a disk and a slider are connected only by the first crank arm. In this case, one end of the first crank arm is attached to the eccentric position of the disk to be attached to the disk so as to be only rotatable. Also, the other end of the first crank arm is attached to the front end position of the slider so as to be only rotatable (that is, to be attached to the slider so as not to be slidable).

As shown in FIG. 11, in the wing flapping apparatus according to the comparative embodiment, the change in moving speed of the slider located in the vicinity of the foremost position within the movable range of this slider is greater in degree than the change in moving speed of the slider located in the vicinity of the rearmost position within the movable range of this slider. This results from the structure in which the other end of a single crank arm connecting the disk and the slider is connected to the front end position of the slider.

Accordingly, the operation of the wing unit that swings back when the slider is located in the vicinity of the rearmost position (that is, the swinging-back operation in which the wing unit swings back at the front side position within the swinging range of the wing unit (which will be hereinafter referred to as a "front-side swinging-back operation")) is performed relatively smoothly according to inertia since the wing unit's speed change is relatively small. On the other hand, the operation of the wing unit that swings back when the slider is located in the vicinity of the foremost position (that is, a swinging-back operation in which the wing unit swings back at the rear side position within the swinging range of the wing unit (which will be hereinafter referred to as a "rear-side swinging-back operation")) is not sufficiently smoothly performed since the wing unit's speed change is relatively large. Thus, in some cases, the rear-side swinging-back operation may be incompletely performed.

When this rear-side swinging-back operation is incompletely performed, the flapping operation of the wing unit does not perform as intended. Accordingly, the attitude of the wing flapping apparatus becomes unstable, thereby increasing fluctuations of the load applied to the output shaft of the rotary motor as a motive power source, which leads to a deterioration in motion efficiency.

On the other hand, according to wing flapping apparatus 1A of the present embodiment, the change in moving speed of slider 35 in the vicinity of the foremost position within the movable range of slider 35 is almost identical to the change in moving speed of slider 35 in vicinity of the rearmost position within the movable range of slider 35. Also, the degree of this moving speed change is sufficiently small.

As described above, this is because the other ends of first and second crank arms 33A and 33B are not only rotatably connected to slider 35 but are also slidably connected to slider 35, thereby producing the idle running state of slider 35 for a prescribed time period in the timing at which slider 35 is located in the vicinity of its foremost position and also in the timing at which slider 35 is located in the vicinity of its rearmost position.

More specifically, as shown in FIG. 6, hole 33b1 provided at the other end of first crank arm 33A and hole 33b2 provided at the other end of second crank arm 33B are formed to be larger than crank pin 34b1 and crank pin 34b2, respectively, in the front-rear direction. Accordingly, in the above-described two timings, the circumferential surface of crank pin 34b1 moving in accordance with rotation of the disk 32c is temporarily not in contact with the wall surface of hole 33b1, and also the circumferential surface of crank pin 34b2 moving in accordance with rotation of disk 32c is temporarily not in contact with the wall surface of hole 33b2. This leads to the state where slider 35 is temporarily not driven by first crank arm 33A and second crank arm 33B.

Accordingly, as shown in FIG. 11, immediately after the state where slider 35 is driven by first crank arm 33A and second crank arm 33B is changed to the idle running state of slider 35 as described above, slider 35 is suddenly decelerated, so that large inertial force is accordingly applied to first wing unit 4A and second wing unit 4B. As a result, the front-side swinging-back operation and the rear-side swinging-back operation of each of first wing unit 4A and second wing unit 4B can be readily accomplished.

Accordingly, the idle running state of slider 35 occurs for the prescribed time period in the prescribed timing as described above, thereby sufficiently reducing the degree of change in moving speed of slider 35 in the vicinity of each of the foremost and rearmost positions within the movable range of slider 35. As a result, each of the front-side swinging-back operation and the rear-side swinging-back operation is to be more smoothly and stably performed.

In this way, in wing flapping apparatus 1A of the present embodiment, it becomes possible to suppress occurrence of an incomplete swinging-back operation of each wing unit as described above. Thereby, the attitude of the wing flapping apparatus is more stabilized and it becomes possible to achieve the effect of significantly improving the motion efficiency as compared with the conventional case.

Furthermore, when the above-described configuration is employed, as can be understood from FIG. 11, the idle running state of slider 35 occurs for a prescribed time period in a prescribed timing. Thereby, in each of: the rearward moving operation of the wing unit from the front-side swinging-back operation to the rear-side swinging-back operation (which will be hereinafter referred to as a "rearward flapping operation"); and the forward moving operation of the wing unit from the rear-side swinging-back operation to the front-side swinging-back operation (which will be hereinafter referred to as a "forward flapping operation"), the moving speed of the wing unit is also further increased (that is, accelerated), so that larger levitation force can be achieved. Therefore, also in this aspect, the motion efficiency is significantly improved, so that a wing flapping apparatus excellent in flight ability can be achieved.

In addition, in the wing flapping apparatus according to the comparative embodiment, the idle running state of the slider as described above does not occur. Accordingly, the drive units including the first wing unit and the second wing unit continuously receive load, with the result that the fluctuations of the load to the driving source are increased. Particularly, during the swinging-back operation of each of the first wing unit and the second wing unit, inertial force is exerted upon the first wing unit, the second wing unit and the slider, so that the above-described increased fluctuations of the load are applied to the driving source.

On the other hand, in wing flapping apparatus 1A in the present embodiment, almost no load is applied to the driving source at the time when the maximum load occurs in the wing flapping apparatus according to the comparative embodiment (that is, at the time of the swinging-back operation of each of the first and second wing units). Also, when the driving force from the driving source is transmitted to slider 35, the reaction caused in accordance with the swinging-back operation of each of first wing unit 4A and second wing unit 4B does not prevent rotation of disk 32c. Thus, according to wing flapping apparatus 1A in the present embodiment, it is possible to both suppress fluctuations of the load to the driving source and to decrease the magnitude of the load applied to the driving source so that a wing flapping apparatus whose driving efficiency is dramatically improved can be achieved.

In wing flapping apparatus 1A of the present embodiment, an example has been given with regard to the configuration in which movement of slider 35 in the front-rear direction and swinging of each of first wing unit 4A and second wing unit 4B in the front-rear direction are opposite in direction to each other. In this case, the effect of improving the motion efficiency achieved by the above-described configuration and the effect of improving the motion efficiency achieved by creating the idle running state of the slider for a prescribed time period in a prescribed timing as described above are independent of each other. Accordingly, it is not an indispensable requirement to provide a configuration in which movement of slider 35 and swinging of each of first wing unit 4A and second wing unit 4B are opposite in direction to each other.

The present embodiment provides an example of the configuration in which, in the state where first wing unit 4A and second wing unit 4B are arranged at the position of three o'clock and the position of nine o'clock, respectively, one end of each of first crank arm 33A and second crank arm 33B that is connected to disk 32c (that is, the end of each crank arm on the side where crank pin 34a is located) is located at the position of three o'clock or nine o'clock with respect to first rotation axis 201 of disk 32c. In this case, however, there is in a strict sense a difference between the forward swinging range and the rearward swinging range of each of first wing unit 4A and second wing unit 4B, each of which starts from the above-described state. Accordingly, in order to set the forward swinging range and the rearward swinging range of each of first and second wing units 4A and 4B starting from the above-described state to be the same, the lengths of first crank arm 33A and second crank arm 33B may be appropriately adjusted such that, in the state where first wing unit 4A and second wing unit 4B are arranged at the position of three o'clock and the position of nine o'clock, respectively, the above-mentioned one ends of first crank arm 33A and second crank arm 33B are disposed on the forward side relative to first rotation axis 201 of disk 32c (that is, on the side of two o'clock when seen from the position of three o'clock and on the side of ten o'clock when seen from the position of nine o'clock).

Also, as described above, in wing flapping apparatus 1A in the present embodiment, power transmission mechanism 3 is provided with a plurality of load fluctuation suppression units A1, A2, B1, B2, C1, and C2. Each of load fluctuation suppression units A1, A2, B1, B2, C1, and C2 serves to suppress fluctuations of the load that is to be transmitted to output shaft 2a of rotary motor 2 through power transmission mechanism 3, the load being generated when first wing unit 4A and second wing unit 4B receive air resistance during swinging of first wing unit 4A and second wing unit 4B. The details of load fluctuation suppression units A1, A2, B1, B2, C1, and C2 will be hereinafter described in detail.

As shown in FIG. 3, load fluctuation suppression units A1 and A2 are formed of first connection rod 31a of first transmission member 31 and second connection rod 32a of second transmission member 32, respectively. In this case, as described above, each of first connection rod 31a and second connection rod 32a is made of carbon fiber, and thus, is more likely to be twisted than metal-made output shaft 2a of rotary motor 2. More specifically, each of first connection rod 31*a* and second connection rod 32*a* is formed, for example, of carbon fiber reinforced plastic (CFRP) that has a fiber orientation in the axis direction of each rod, so as to be prepared as a member having proper elasticity against twisting and also having proper rigidity against flexure. Accordingly, first connection rod 31*a* and second connection rod 32*a* are twisted during transmission of the load as described above, so that first connection rod 31*a* and second connection rod 32*a* can absorb fluctuations of this load to a considerable degree.

In this case, when first connection rod 31*a* and second connection rod 32*a* are more likely to be twisted, these first connection rod 31*a* and second connection rod 32*a* receive fluctuations of the load to thereby cause a slight phase shift in transmission of the rotational motion. However, if this phase shift is sufficiently small, this sufficiently small phase shift does not cause a large loss in transmission of the motion, but the effect of absorbing fluctuations of the load as described above is remarkably achieved.

Accordingly, fluctuations of the load transmitted to output shaft 2*a* of rotary motor 2 through power transmission mechanism 3 from first wing unit 4A and second wing unit 4B in accordance with swinging of first wing unit 4A and second wing unit 4B are absorbed by load fluctuation suppression units A1 and A2, and thereby equalized. Therefore, fluctuations of the load applied to output shaft 2*a* of rotary motor 2 can be significantly suppressed.

Also as shown in FIG. 3, load fluctuation suppression unit B1 is formed of an engagement portion between gear 2*b* of rotary motor 2 and gear 31*b* of first transmission member 31 while load fluctuation suppression unit B2 is formed of an engagement portion between gear 31*c* of first transmission member 31 and gear 32*b* of second transmission member 32. In this case, as described above, each of these engagement portions has a gap of a prescribed size, that is, a so-called backlash. In other words, since each of these engagement portions has a sufficient backlash, fluctuations of the load can be absorbed to a considerable degree due to existence of this backlash during the above-described transmission of the load.

In this case, when each of these engagement portions has an unnecessarily large backlash, a loss may occur in transmission of the motion, and the useful life of each gear may be shortened. However, when the size of this backlash is optimized, transmission of the motion and the useful life of each gear are not significantly influenced thereby, but the effect of absorbing fluctuations of the load described above is remarkably achieved.

Thus, fluctuations of the load transmitted to output shaft 2*a* of rotary motor 2 through power transmission mechanism 3 from first wing unit 4A and second wing unit 4B in accordance with swinging of first wing unit 4A and second wing unit 4B are absorbed by load fluctuation suppression units B1 and B2, and thereby equalized. Therefore, fluctuations of the load applied to output shaft 2*a* of rotary motor 2 can be significantly suppressed. In addition, it is preferable that the amount of the above-described backlash is set as large as possible within the range in which transmission of the rotational motion between the gears is not prevented.

Furthermore, as shown in FIG. 4, each of load fluctuation suppression units C1 and C2 is formed by elastic belt 36. In this case, as described above, elastic belt 36 exhibits excellent elasticity. Accordingly, when the above-mentioned load is transmitted from first rotating body 37 and second rotating body 38 to slider 35, elastic belt 36 is elastically deformed (mainly extended), so that fluctuations of this load can be absorbed to a considerable degree.

In this case, elastic belt 36 is used to thereby cause a slight transmission delay to occur during transmission of the motion. However, when the transmission delay is sufficiently small, this sufficiently small transmission delay does not cause a large loss in transmission of the motion, but the effect of absorbing fluctuations of the load described above is remarkably achieved.

Accordingly, fluctuations of the load transmitted to output shaft 2*a* of rotary motor 2 through power transmission mechanism 3 from first wing unit 4A and second wing unit 4B in accordance with swinging of first wing unit 4A and second wing unit 4B are absorbed by load fluctuation suppression units C1 and C2, and thereby equalized. Therefore, fluctuations of the load applied to output shaft 2*a* of rotary motor 2 can be significantly suppressed.

As described above, in wing flapping apparatus 1A in the present embodiment, fluctuations of the load that is to be transmitted from first wing unit 4A and second wing unit 4B to output shaft 2*a* of rotary motor 2 through power transmission mechanism 3 can be significantly suppressed by load fluctuation suppression units A1, A2, B1, B2, C1, and C2 provided in power transmission mechanism 3. Accordingly, the motion efficiency is significantly improved as compared with the conventional case, so that a wing flapping apparatus excellent in flight ability can be achieved.

The present embodiment has been described with reference to an example in which first connection rod 31*a* and second connection rod 32*a* each formed of a member that is more likely to be twisted than metal-made output shaft 2*a* of rotary motor 2 are used as load fluctuation suppression units A1 and A2, respectively. Alternatively, first connection rod 31*a* and second connection rod 32*a* each formed of a member that is more likely to undergo flexure than metal-made output shaft 2*a* of rotary motor 2 can be used as load fluctuation suppression units A1 and A2, respectively.

More specifically, each of first connection rod 31*a* and second connection rod 32*a* is formed by a member that is rendered relatively readily flexure-deformable, for example, by subjecting a hardly-deformable metal-made member to shape-machining (by way of example, shape-machining for cutting a slit on the surface of a metal-made rod) or the like. Thereby, each of first connection rod 31*a* and second connection rod 32*a* can be formed as a member having proper elasticity against flexure and also having proper rigidity against twisting. Accordingly, when each of first connection rod 31*a* and second connection rod 32*a* is formed of such a member, these first connection rod 31*a* and second connection rod 32*a* undergo flexure during the above-described transmission of the load, so that fluctuations of this load can be absorbed to a considerable degree.

In this case, when first connection rod 31*a* and second connection rod 32*a* are more likely to undergo flexure, these first connection rod 31*a* and second connection rod 32*a* receive fluctuations of the load, thereby causing a slight axial misalignment. However, when this axial misalignment is sufficiently small, this sufficient small axial misalignment does not cause a large loss in transmission of the motion, but the effect of absorbing fluctuations of the load as described above is remarkably achieved.

Accordingly, fluctuations of the load transmitted to output shaft 2*a* of rotary motor 2 through power transmission mechanism 3 from first wing unit 4A and second wing unit 4B in accordance with swinging of first wing unit 4A and second wing unit 4B are absorbed by load fluctuation suppression units A1 and A2, and thereby equalized. Therefore, fluctuations of the load applied to output shaft 2a of rotary motor 2 can be significantly suppressed.

Furthermore, each of first connection rod 31a and second connection rod 32a can also be formed of a member that is more likely to undergo twisting and flexure than metal-made output shaft 2a of rotary motor 2. In this case, each of first connection rod 31a and second connection rod 32a may be formed of: a member made of resin or rubber; a member made of relatively readily deformable metal; a member that is rendered relatively readily deformable by subjecting a hardly-deformable metal-made member to shape-machining and the like (for example, a spring-shaped member); or the like. Also in the configuration formed in this way, fluctuations of the load applied to output shaft 2a of rotary motor 2 can be significantly suppressed.

In addition, in wing flapping apparatus 1A in the present embodiment, a plurality of load fluctuation suppression units A1, A2, B1, B2, C1, and C2 are provided. However, as long as at least one of load fluctuation suppression units A1, A2, B1, B2, C1, and C2 is provided in power transmission mechanism 3, the motion efficiency is improved to a considerable degree. For example, in the above-described present embodiment, only one of first connection rod 31a and second connection rod 32a may be formed of carbon fiber reinforced plastic.

Second Embodiment

Figure 12:
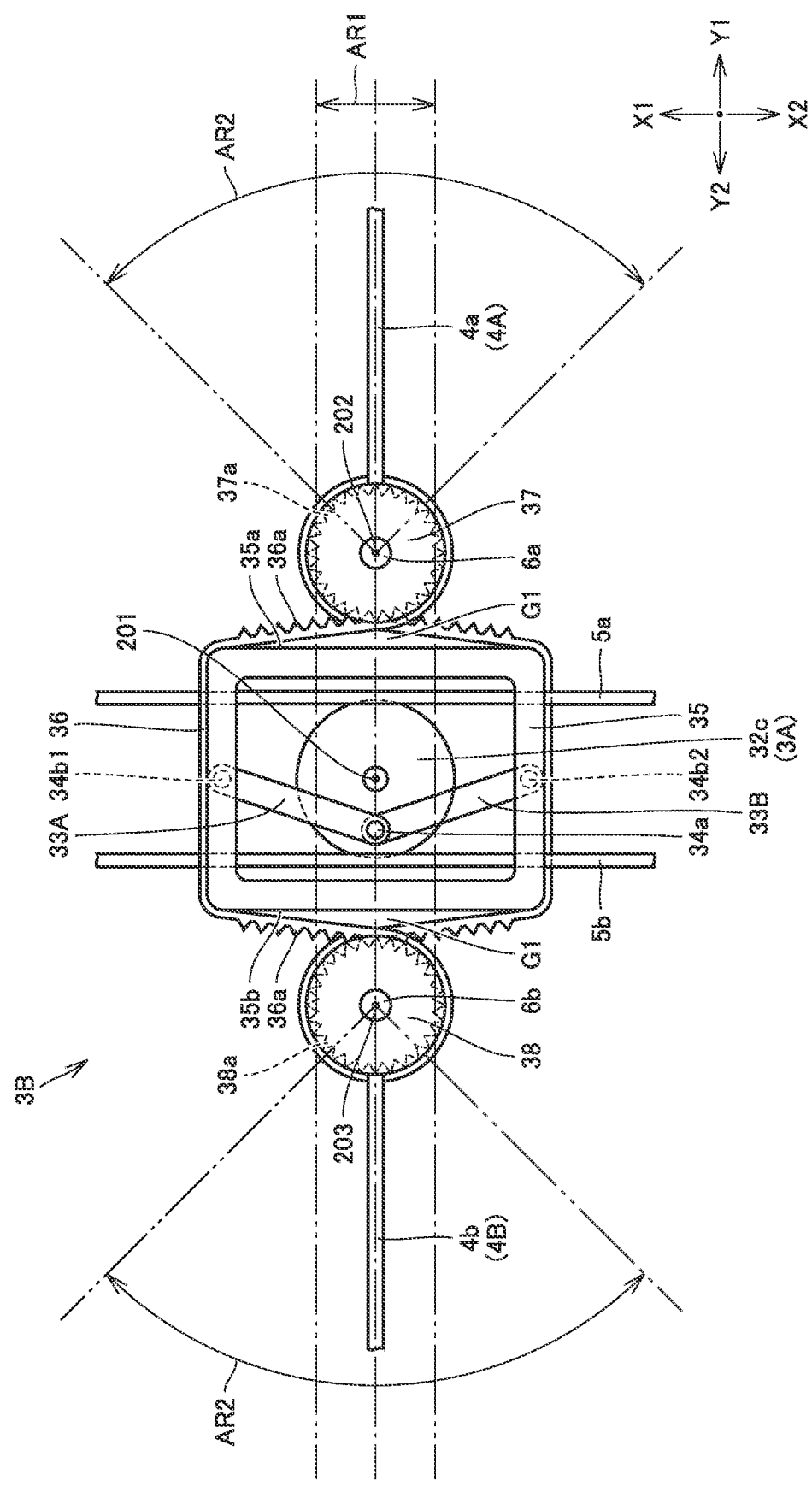
FIG. 12 is a schematic top view showing the configuration of a motion conversion unit of the wing flapping apparatus of a second embodiment of the present invention.

FIG. 12 is a schematic top view showing the configuration of a motion conversion unit of a wing flapping apparatus in the second embodiment of the present invention. In the following, referring to FIG. 12, a wing flapping apparatus 1B in the present embodiment will be hereinafter described. Since the operation of wing flapping apparatus 1B according to the present embodiment is basically the same as the operation of wing flapping apparatus 1A in the first embodiment, the description thereof will not be hereinafter repeated.

As shown in FIG. 12, wing flapping apparatus 1B in the present embodiment has a configuration in which the distance between slider 35 and each of first rotating body 37 and second rotating body 38 is greater than that in wing flapping apparatus 1A in the above-described first embodiment.

Specifically, in wing flapping apparatus 1B, the distance between slider 35 and each of first rotating body 37 and second rotating body 38 is adjusted so as to be greater than that in wing flapping apparatus 1A, thereby forming a gap G1 between elastic belt 36 and each of right side surface 35a and left side surface 35b of slider 35.

In the configuration formed in this way, not only the effect as described in the above first embodiment can be achieved, but also elastic belt 36 is more likely to undergo deformation such as expansion and contraction by the amount corresponding to gap G1. Also, this deformation such as expansion and contraction is not inhibited by slider 35, first rotating body 37 and second rotating body 38. Accordingly, it becomes possible to achieve the effect capable of more remarkably absorbing fluctuations of the load as described above. Therefore, the motion efficiency is further significantly improved, so that a wing flapping apparatus particularly excellent in flight ability can be achieved.

Also, it is preferable that gap G1 is formed such that the distance between slider 35 and each of the portion of elastic belt 36 that engages with first rotating body 37 and the portion of elastic belt 36 that engages with second rotating body 38 is greater than the thickness of elastic belt 36.

Third Embodiment

Figure 13:
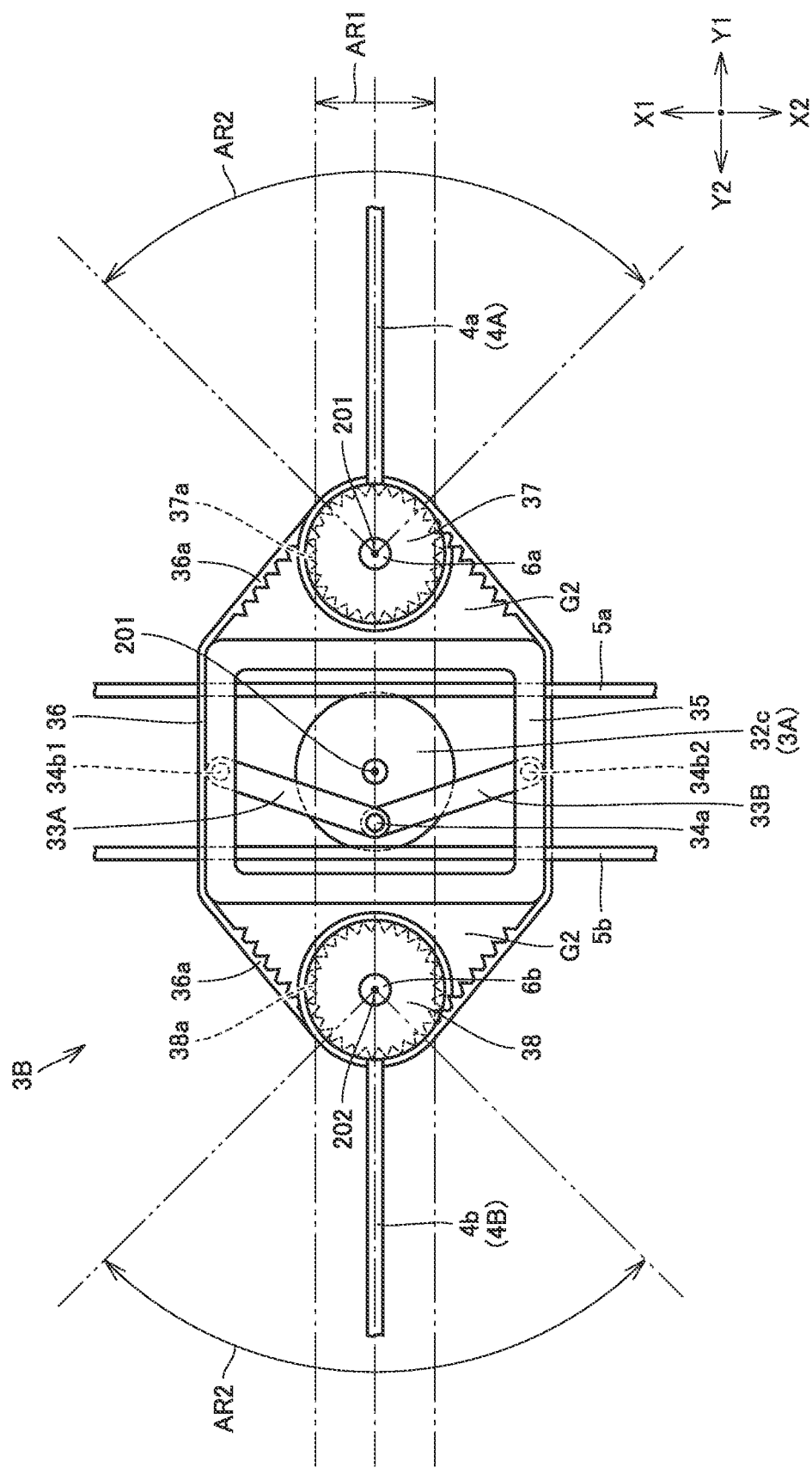
FIG. 13 is a schematic top view showing the configuration of a motion conversion unit of a wing flapping apparatus of a third embodiment of the present invention.

FIG. 13 is a schematic top view showing the configuration of a motion conversion unit of a wing flapping apparatus in the third embodiment of the present invention. In the following, a wing flapping apparatus 1C in the present embodiment will be described with reference to FIG. 13.

As shown in FIG. 13, wing flapping apparatus 1C in the present embodiment is different from wing flapping apparatus 1A in the above-described first embodiment in the way how elastic belt 36 is wound around first rotating body 37 and second rotating body 38.

Specifically, wing flapping apparatus 1A is configured such that a portion of elastic belt 36 that is wound around the outer circumferential surface of slider 35 and a portion of elastic belt 36 that is wound around the outer circumferential surface of first rotating body 37 are changed at a portion between slider 35 and first rotating body 37 (for example, see FIG. 4 and the like). On the other hand, wing flapping apparatus 1C is configured such that the above-mentioned changed portion of elastic belt 36 that is wound around each of the above-described surfaces is located on the opposite side of slider 35 with respect to first rotating body 37 (that is, on the side where first wing unit 4A is located).

Similarly, wing flapping apparatus 1A is configured such that a portion of elastic belt 36 that is wound around the outer circumferential surface of slider 35 and a portion of elastic belt 36 that is wound around the outer circumferential surface of second rotating body 38 are changed at a portion between slider 35 and second rotating body 38 (for example, see FIG. 4 and the like). On the other hand, wing flapping apparatus 1C is configured such that the above-mentioned changed portion of elastic belt 36 that is wound around each of the above-described surfaces is located on the opposite side of slider 35 with respect to second rotating body 38 (that is, on the side where second wing unit 4B is located).

Accordingly, each of teeth 36a faces inward (that is, faces the slider 36 side) in the portion of elastic belt 36 that is located between the sections of elastic belt 36 that are wound around the circumferential surface of first rotating body 37 and the circumferential surface of second rotating body 38 and the section of elastic belt 36 that is wound around the outer circumferential surface of slider 35 (that is, in the portion of elastic belt 36 that is not wound around each of slider 35, first rotating body 37 and second rotating body 38).

Also in this case, as in the above-described second embodiment, a gap G2 is provided between elastic belt 36 and each of right side surface 35a and left side surface 35b of slider 35. Accordingly, elastic belt 36 is more likely to undergo deformation such as expansion and contraction by the amount corresponding to gap G2. Also, this deformation such as expansion and contraction is not inhibited by slider 35, first rotating body 37 and second rotating body 38. Thus, it becomes possible to achieve the effect capable of more remarkably absorbing fluctuations of the load as described above.

Furthermore, in the configuration as described above, unlike the operation of wing flapping apparatus 1A in the above-described first embodiment, movement of slider 35 in the front-rear direction and swinging of each of first wing unit 4A and second wing unit 4B in the front-rear direction occur in the same direction almost at all times. In this case, however, it becomes possible to reliably achieve the effect of improving the motion efficiency that is achieved by providing the idle running state of slider 35 for a prescribed time period in a prescribed timing. Accordingly, the motion efficiency is improved as compared with the conventional case, so that a wing flapping apparatus particularly excellent in flight ability can be achieved.

In addition, when employing the configuration as in the present embodiment, in order to suppress occurrence of periodical vibrations in frame body 100, it is preferable to separately provide a balance mass serving as a counter weight for motion of the first wing unit 4A, the second wing unit 4B and the slider 35; and its drive mechanism; and the like.

Fourth Embodiment

Figure 14:
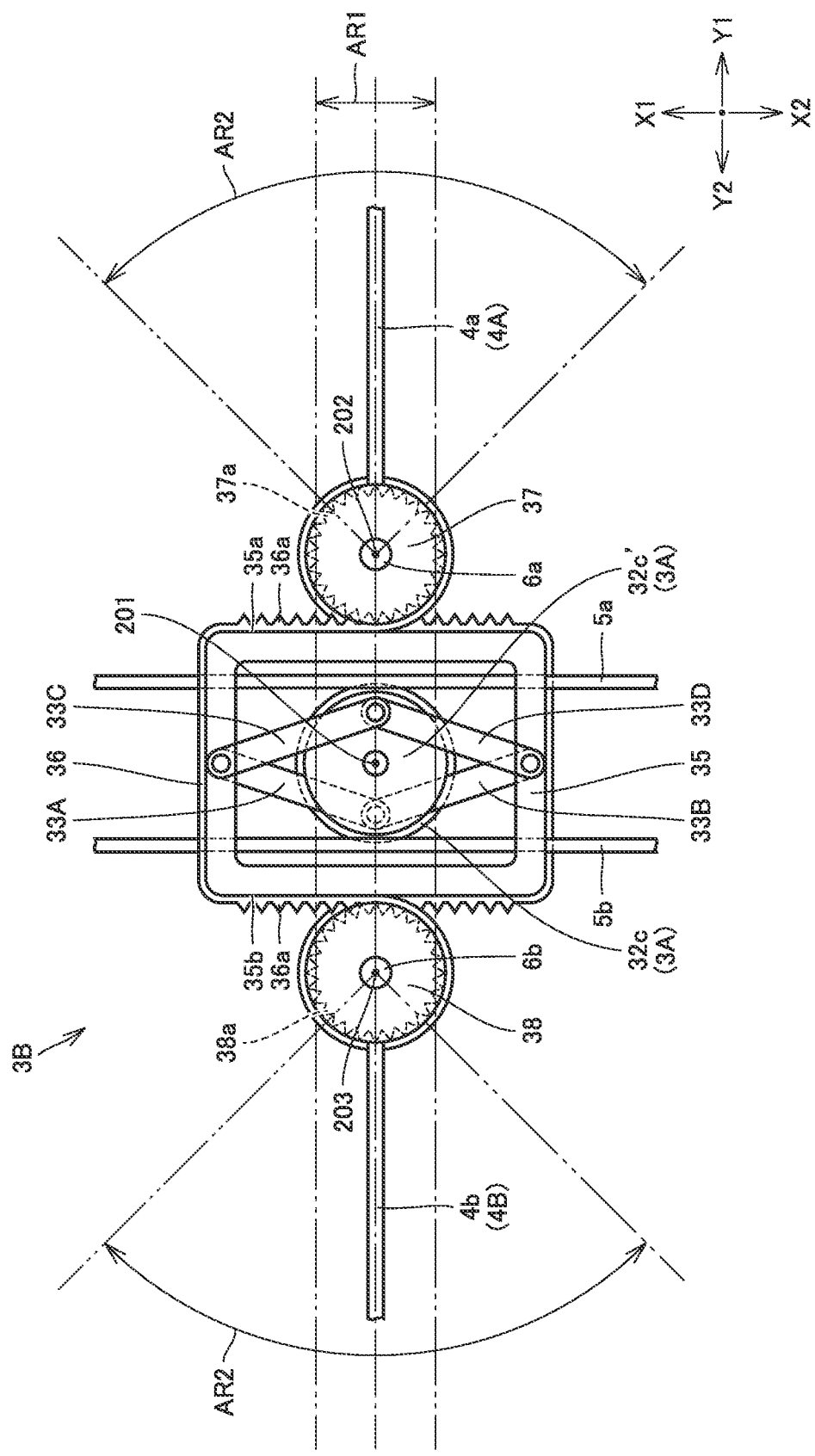
FIG. 14 is a schematic top view showing the configuration of a motion conversion unit of a wing flapping apparatus of a fourth embodiment of the present invention.

FIG. 14 is a schematic top view showing the configuration of a motion conversion unit of a wing flapping apparatus in the fourth embodiment of the present invention. In the following, referring to FIG. 14, a wing flapping apparatus 1D in the present embodiment will be described. Since the operation of wing flapping apparatus 1D in the present embodiment is basically the same as the operation of wing flapping apparatus 1A in the above-described first embodiment, the description thereof will not be repeated.

As shown in FIG. 14, in wing flapping apparatus 1D in the present embodiment, a pair of (that is, two) crank arms each connecting disk 32c as a rotation transmission member and slider 35 are further added, which is different from wing flapping apparatus 1A in the above-described first embodiment.

Specifically, in wing flapping apparatus 1D, a disk 32c' which is configured to rotate together with disk 32c is provided on disk 32c so as to be integral with disk 32c. Also, a third crank arm 33C and a fourth crank arm 33D are provided so as to connect the front end position and the rear end position, respectively, of slider 35 to the eccentric position of disk 32c'.

In this case, the structure for attaching third crank arm 33C and fourth crank arm 33D to disk 32c' is the same as the structure for attaching first crank arm 33A and second crank arm 33B to disk 32c. Also, the structure for attaching third crank arm 33C and fourth crank arm 33D to slider 35 is the same as the structure for attaching first crank arm 33A and second crank arm 33B to slider 35.

In addition, as seen in the extending direction of first rotation axis 201, the position at which third crank arm 33C and fourth crank arm 33D are connected to disk 32c' is point-symmetric, with respect to first rotation axis 201, to the position at which first crank arm 33A and second crank arm 33B are connected to disk 32c. Also, the positions at which third crank arm 33C and fourth crank arm 33D are connected to slider 35 are located immediately above their respective positions at which first crank arm 33A and second crank arm 33B are connected to slider 35 (that is, the position above with slider 35 interposed therebetween).

In the configuration described above, not only the effect described in the above first embodiment is achieved, but also the configuration of the crank mechanism for connecting disk 32c and slider 35 is left-right symmetric in wing flapping apparatus 1D. Accordingly, the effect capable of further suppressing occurrence of vibrations in frame body 100 can be achieved. Therefore, the motion efficiency is further improved, so that a wing flapping apparatus particularly excellent in flight ability can be achieved.

Fifth Embodiment

Figure 15:
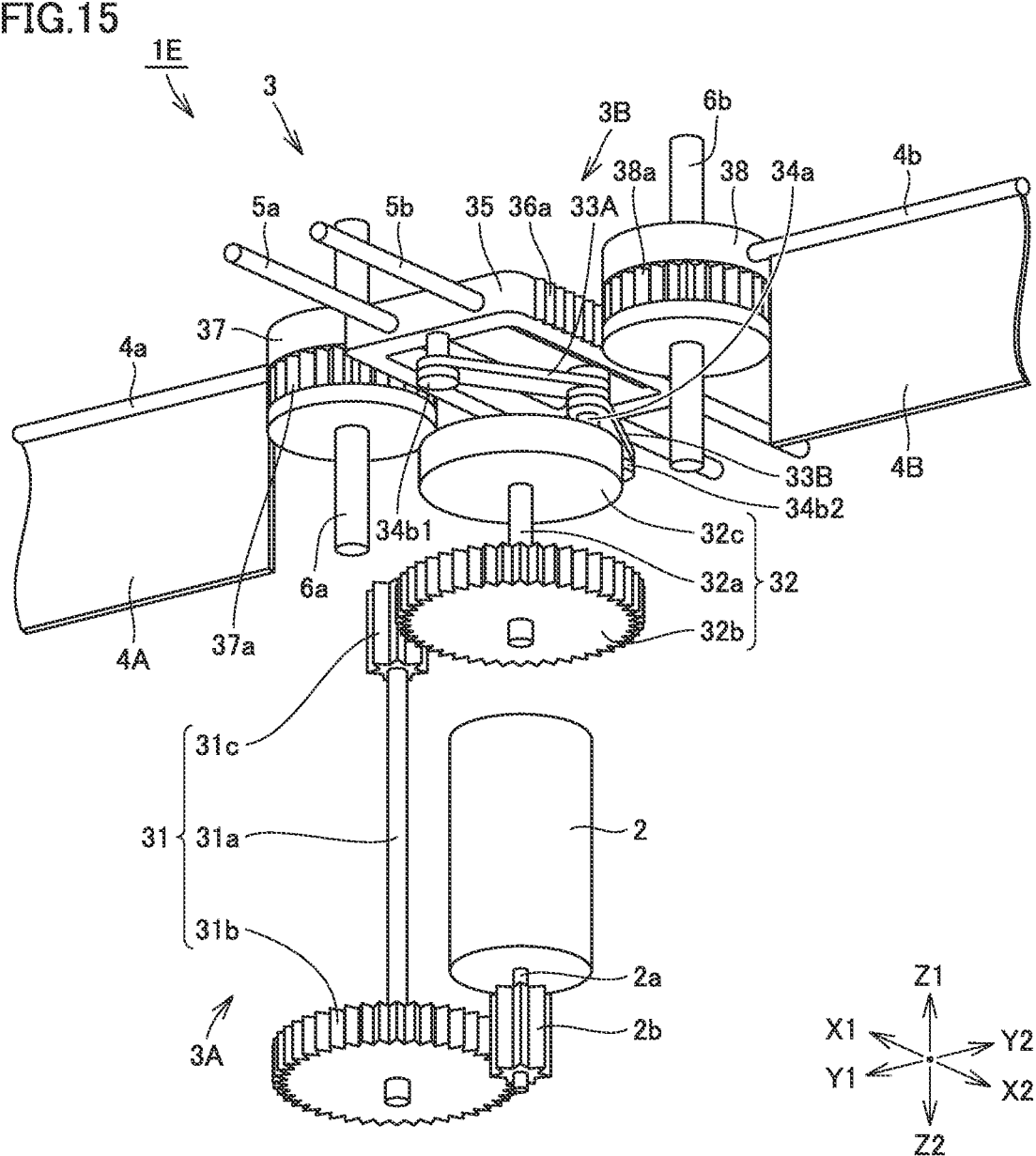
FIG. 15 is a schematic perspective view of a main part of a wing flapping apparatus of the fifth embodiment of the present invention, absent the frame body.
Figure 16:
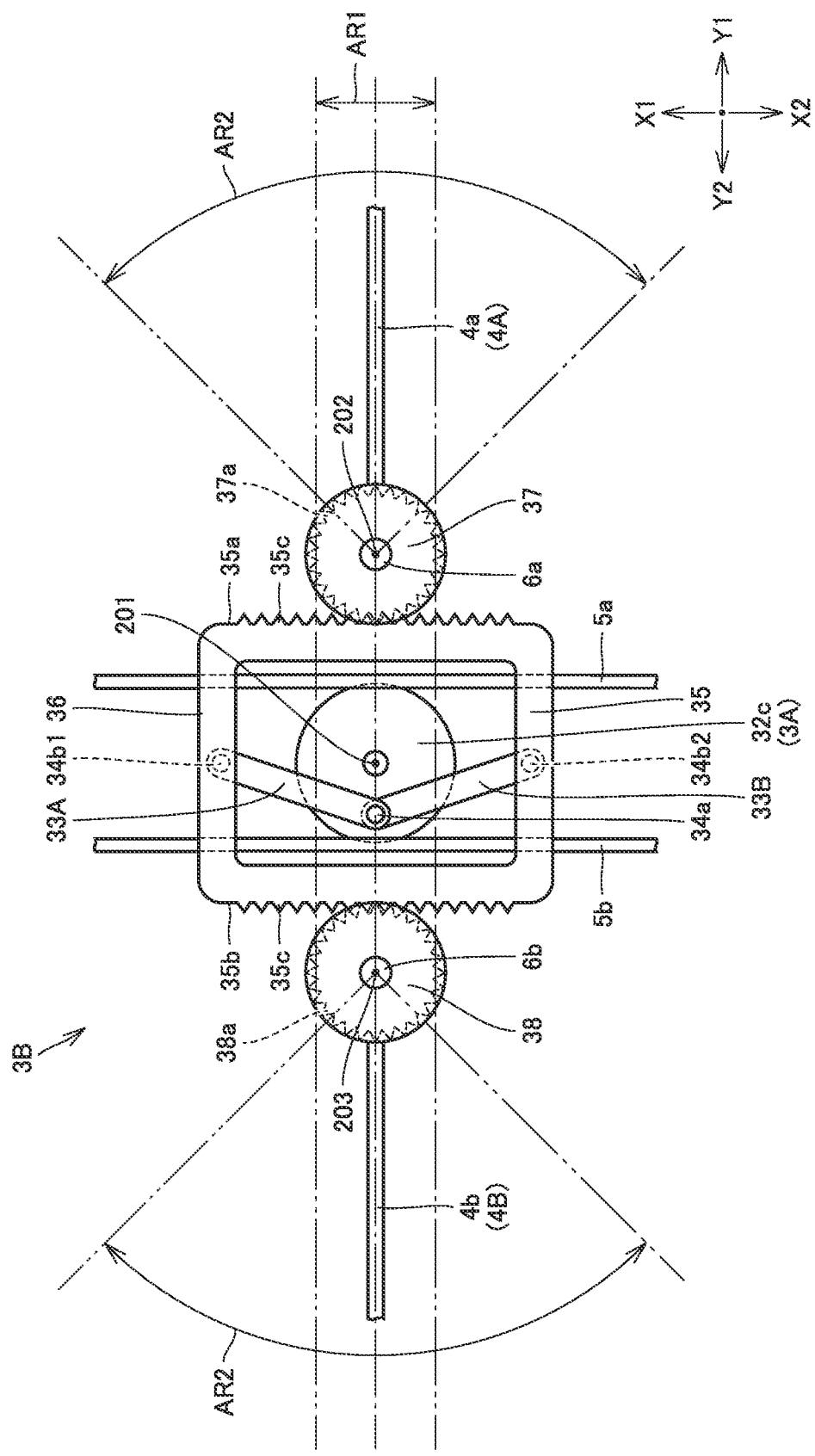
FIG. 16 is a schematic top view for illustrating the configuration and the operation of a motion conversion unit of the wing flapping apparatus of a fifth embodiment of the present invention.

FIG. 15 is a schematic perspective view of a main part of a wing flapping apparatus without showing a frame body in the fifth embodiment of the present invention. FIG. 16 is a schematic top view for illustrating the configuration and the operation of a motion conversion unit shown in FIG. 15. In the following, a wing flapping apparatus 1E in the present embodiment will be described with reference to these FIGS. 15 and 16.

As shown in FIGS. 15 and 16, wing flapping apparatus 1E in the present embodiment is different only in the configuration of motion conversion unit 3B of power transmission mechanism 3, as compared with wing flapping apparatus 1A in the above-described first embodiment.

Specifically, motion conversion unit 3B mainly includes: a crank formed of first crank arm 33A, second crank arm 33B, and crank pins 34a, 34b1 and 34b2; slider 35; first rotating body 37; and second rotating body 38, but does not include elastic belt 36 as shown in the above-described first embodiment. In this case, slider 35 is formed as a toothed slider. More specifically, teeth 35c are provided on each of right side surface 35a and left side surface 35b of slider 35.

First rotating body 37 and second rotating body 38 are arranged such that their respective circumferential surfaces contact right side surface 35a and left side surface 35b, respectively, of slider 35. Thereby, teeth 35c provided on right side surface 35a of slider 35 engage with teeth 37a of the gear groove provided on the circumferential surface of first rotating body 37 while teeth 35c provided on left side surface 35b of slider 35 engage with teeth 38a of the gear groove provided on the circumferential surface of second rotating body 38.

In other words, in wing flapping apparatus 1E in the present embodiment, the motion transmission between slider 35 and each of first rotating body 37 and second rotating body 38 is implemented by a so-called rack-and-pinion mechanism, in which slider 35 formed of a toothed slider engages with each of first rotating body 37 and second rotating body 38 each formed of a gear, thereby implementing motion transmission therebetween.

In this case, as shown in FIG. 16, in accordance with reciprocating linear motion of slider 35 in the X-axis direction, first rotating body 37 and second rotating body 38 reciprocate in their respective rotation directions about first rotation axis 201 and second rotation axis 202, respectively, each as the center of rotation. In addition, the rotation direction of first rotating body 37 and the rotation direction of second rotating body 38 are opposite to each other at all times.

Thereby, when first rotating body 37 and second rotating body 38 serving as output units of motion conversion unit 3B synchronously reciprocate in their respective rotation directions about their respective first rotation axis 201 and second rotation axis 202 each as the center of rotation, first wing unit 4A and second wing unit 4B are driven by first rotating body 37 and second rotating body 38, respectively, so as to synchronously swing.

In this case, although not described herein in detail, as in the above-described first embodiment, linear reciprocation of slider 35 and swinging of each of first wing unit 4A and second wing unit 4B are opposite in direction to each other at all times, so that slider 35 acts as a counterweight. Thereby, the inertial force caused by swinging of first wing unit 4A and second wing unit 4B is counteracted at all times.

Although not specifically described below, the other ends of first and second crank arms 33A and 33B are not only rotatably connected to slider 35 but also slidably connected to slider 35 as in the above-described first embodiment. Accordingly, the idle running state of slider 35 occurs in a prescribed timing for a prescribed time period. As a result, each of the front-side swinging-back operation and the rear-side swinging-back operation can be more smoothly and stably performed. Also, the moving speed of each wing unit is further increased (that is, accelerated) in the rearward flapping operation and the forward flapping operation. Consequently, larger levitation force can be achieved.

Accordingly, also in the configuration formed in this way, the effect similar to the effect explained in the above-described first embodiment can be achieved, so that a wing flapping apparatus improved in motion efficiency and excellent in flight ability can be achieved.

Sixth Embodiment

Figure 17:
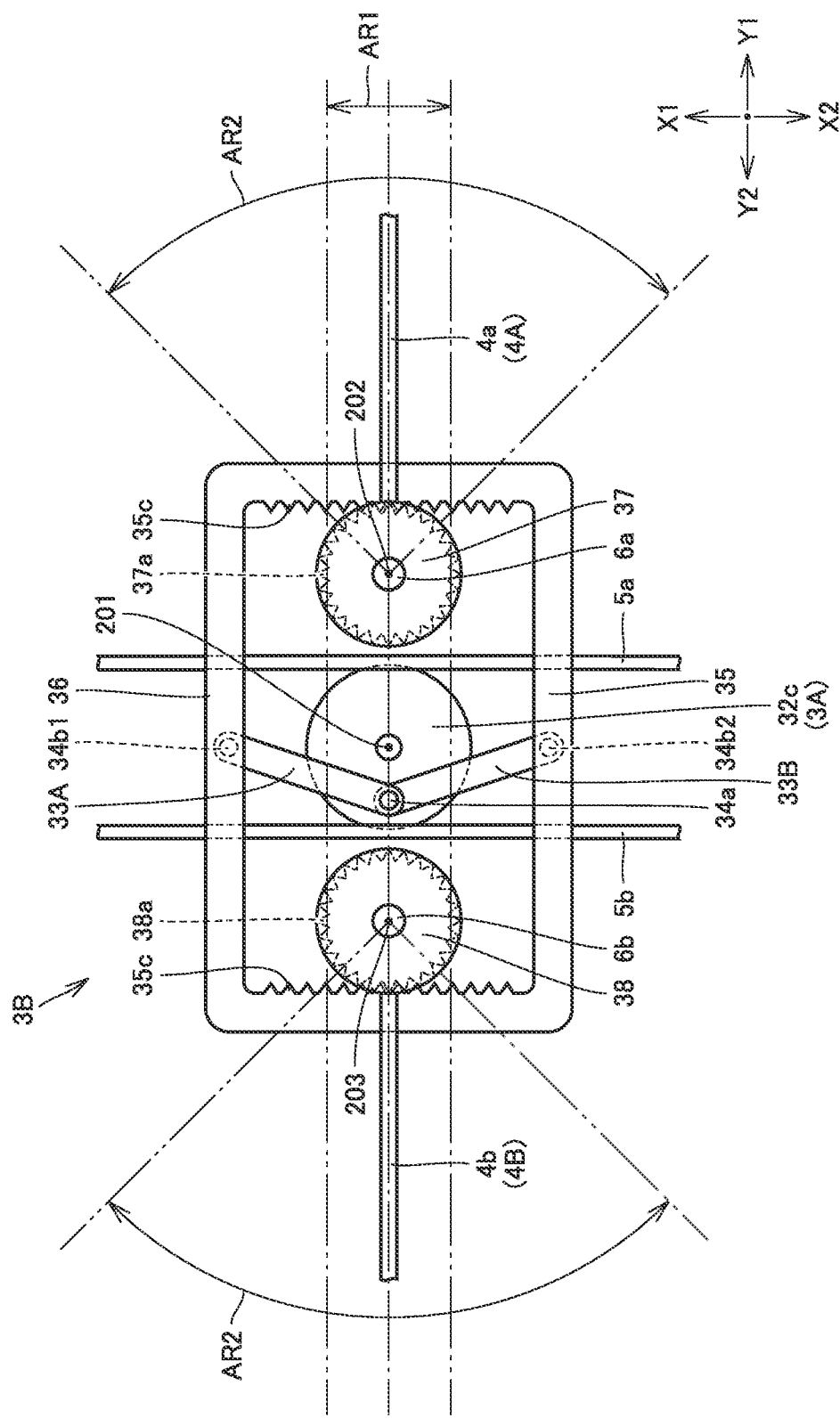
FIG. 17 is a schematic top view showing the configuration of a motion conversion unit of a wing flapping apparatus of a sixth embodiment of the present invention.

FIG. 17 is a schematic top view showing the configuration of a motion conversion unit of a wing flapping apparatus in the sixth embodiment of the present invention. In the following, referring to FIG. 17, a wing flapping apparatus 1F in the present embodiment will be described.

As shown in FIG. 17, wing flapping apparatus 1F in the present embodiment is different in configuration of slider 35 from wing flapping apparatus 1E in the above-described fifth embodiment.

Specifically, wing flapping apparatus 1E has a configuration in which first rotating body 37 and second rotating body 38 are arranged on the outside of the right side portion and the left side portion, respectively, of slider 35 formed of a member having a rectangular frame shape (for example, see FIG. 16). On the other hand, wing flapping apparatus 1F has a configuration in which first rotating body 37 and second rotating body 38 are arranged on the inside of the right side portion and the left side portion, respectively, of slider 35 by adjusting the size of slider 35 formed of a member having a rectangular frame shape.

In accordance with the above-described configuration, slider 35 is provided with teeth 35c on its inner circumferential surface of the right side portion and its inner circumferential surface of the left side portion so as to respectively engage with teeth 37a on the gear groove provided on the circumferential surface of first rotating body 37, and with teeth 38a on the gear groove provided on the circumferential surface of second rotating body 38.

In the configuration as described above, unlike the operation of wing flapping apparatus 1E in the above-described fifth embodiment, movement of slider 35 in the front-rear direction and swinging of each of first wing unit 4A and second wing unit 4B in the front-rear direction occur in the same direction almost at all times. In this case, it becomes possible to reliably achieve the effect of improving the motion efficiency that is achieved by providing the idle running state of slider 35 for a prescribed time period in a prescribed timing. Accordingly, the motion efficiency is improved as compared with the conventional case, so that a wing flapping apparatus particularly excellent in flight ability can be achieved.

When employing the configuration as in the present embodiment, in order to suppress occurrence of periodical vibrations in frame body 100, it is preferable to separately provide: a balance mass serving as a counter weight for motion of first wing unit 4A, second wing unit 4B and slider 35; its drive mechanism; and the like.

In the first to sixth embodiments of the present invention described above, an explanation has been given with reference to an example of the configuration in which the motive power generated in a single motive power source is distributed by a power transmission mechanism, so that the wing unit provided on the starboard side of the frame body and the wing unit provided on the port side of the frame body are simultaneously driven. However, there may be a configuration in which the wing unit provided on the starboard side of the frame body and the wing unit provided on the port side of the frame body are driven separately by independently provided driving sources.

In the first to sixth embodiments of the present invention as described above, an explanation has been given with reference to an example in which one wing unit is provided on each of the starboard side and the port side of the frame body, but a plurality of wing units may be provided on each of the starboard side and the port side of the frame body.

In the first to fourth embodiments described above, an annular (that is, endless) elastic belt formed of a single member is wound around the slider, the first rotating body and the second rotating body. Alternatively, a non-annular (that is, non-endless) elastic belt having an end may be employed. Also alternatively, a first elastic belt wound around only the slider and the first rotating body and a second elastic belt wound around only the slider and the second rotating body may be employed in lieu of a single elastic belt.

In the first to fourth embodiments described above, each of the first and second rotating bodies are formed of a gear while the elastic belt is formed of a toothed belt. Instead, each of the first and second rotating bodies may be formed of a friction roller with no teeth and the elastic belt may be formed of a friction belt with no teeth.

In the fifth and sixth embodiments described above, each of the first and second rotating bodies is formed of a gear while the slider is formed of a slider provided with teeth. Instead, each of the first and second rotating bodies may be formed of a friction roller with no teeth and the slider may be formed of a friction slider with no teeth.

Furthermore, the specific configuration of the motive power source and the specific configuration of the power transmission mechanism can be modified as appropriate within the scope not deviating from the subject of the present invention. Also, the characteristic configuration disclosed in the above-described embodiments can be combined with each other within the scope not deviating from the subject of the present invention.

Thus, the above-described embodiments disclosed herein are illustrative and non-restrictive in every respect. The technical scope of the present invention is defined by the terms of the claims, and is intended to include any modifications within the meaning and scope equivalent to the terms of the claims.

The present application claims the benefit of priority based on Japanese Patent Application No. 2016-037484 filed on Feb. 29, 2016. The entire disclosure of this Japanese Patent Application is incorporated herein by reference in its entirety.

REFERENCE SIGNS LIST 1A to 1F wing flapping apparatus, 2 rotary motor, 2a output shaft, 2b gear, 3 power transmission mechanism, 3A rotational motion transmission unit, 3B motion conversion unit, 31 first transmission member, 31a first connection rod, 31b, 31c gear, 32 second transmission member, 32a second connection rod, 32b gear, 32c, 32c' disk, 33A first crank arm, 33B second crank arm, 33C third crank arm, 33D fourth crank arm, 33a1, 33a2, 33b1, 33b2 hole, 34a, 34b1, 34b2 crank pin, 35 slider, 35a right side surface, 35b left side surface, 35c teeth, 36 elastic belt, 36a teeth, 37 first rotating body, 37a teeth, 38 second rotating body, 38a teeth, 4A first wing unit, 4B second wing unit, 4a, 4b mast, 5a, 5b slide guide, 6a, 6b guide shaft, 100 frame body, 201 first rotation axis, 202 second rotation axis, 203 third rotation axis, A1, A2, B1, B2, C1, C2 load fluctuation suppression unit, G1, G2 gap.

The invention claimed is:

1. A wing flapping apparatus comprising:
a frame body;
a motive power source installed in the frame body;
a wing unit; and
a power transmission mechanism configured to transmit motive power generated in the motive power source to the wing unit;
the wing unit being configured to be driven by the power transmission mechanism;
the power transmission mechanism including:
a rotation transmission member rotatably supported by the frame body, the rotation transmission member being configured to rotate about a first rotation axis as a center of rotation upon reception of the motive power transmitted from the motive power source;
a slider movably supported by the frame body, the slider being configured to linearly reciprocate in a first direction upon reception of the motive power transmitted from the rotation transmission member; and
a rotating body rotatably supported by the frame body, the rotating body being configured to, upon reception of the motive power transmitted from the slider, reciprocate in a rotation direction about a second rotation axis as a center of rotation, the second rotation axis extending in a second direction that is orthogonal to the first direction;
the wing unit having a proximal end and a distal end, the proximal end being fixed to the rotating body, to allow the wing unit to swing such that the distal end moves approximately in the first direction as the rotating body reciprocates in the rotation direction;
the power transmission mechanism further including a pair of crank arms each configured to connect the rotation transmission member and the slider,
the pair of crank arms having:
one ends that are connected to an eccentric position of the rotation transmission member so as to be rotatable about a common rotation axis as a center of rotation, the common rotation axis extending in a direction parallel with an extending direction of the first rotation axis; and
the other ends that are separately connected to the slider so as to be rotatable about a corresponding one of separate rotation axes each as a center of rotation, the separate rotation axes extending in the direction parallel with the extending direction of the first rotation axis and being spaced apart from each other in the first direction;
the other ends of the pair of crank arms being connected to the slider so as to be slidable in a direction orthogonal to the extending direction of the first rotation axis.

2. The wing flapping apparatus according to claim 1, wherein movement of the slider in the first direction and swinging of the wing unit in the first direction are opposite in direction to each other.

3. The wing flapping apparatus according to claim 1, wherein the inertial force caused by the movement of the wing unit is opposite to the inertial force caused by movement of the slider.

4. The wing flapping apparatus according to claim 1, wherein:
each of the other ends of the pair of crank arms is provided with a hole, and a crank pin is attached to the slider so as to be inserted into the hole, to allow each of the other ends of the pair of crank arms to be rotatably connected to the slider; and
the crank pin is loosely fitted in the hole, to allow each of the other ends of the pair of crank arms to be connected to the slider so as to be slidable in a direction orthogonal to the extending direction of the first rotation axis.

5. The wing flapping apparatus according to claim 4, wherein
the power transmission mechanism further includes an elastic belt partially fixed to the slider; and
a portion of the elastic belt that is not fixed to the slider is wound around the rotating body, to allow the rotating body to reciprocate in the rotation direction as the slider linearly reciprocates.

6. The wing flapping apparatus according to claim 5, wherein:
the rotating body is formed of a gear; and
the elastic belt is formed of a toothed belt configured to engage with the gear.

7. The wing flapping apparatus according to claim 1 wherein the slider and the rotating body contact each other, to allow the rotating body to reciprocate in the rotation direction as the slider linearly reciprocates.

8. The wing flapping apparatus according to claim 7, wherein:
the rotating body is formed of a gear; and
the slider is formed of a toothed slider configured to engage with the gear.

9. A wing flapping apparatus comprising:
a frame body;
a motive power source installed in the frame body;
a first wing unit and a second wing unit; and
a power transmission mechanism configured to transmit motive power generated in the motive power source to the first wing unit and the second wing unit, the first wing unit and the second wing unit being configured to be driven by the power transmission mechanism, the power transmission mechanism including:
a rotation transmission member rotatably supported by the frame body, the rotation transmission member being configured to rotate about a first rotation axis as a center of rotation upon reception of the motive power transmitted from the motive power source;
a slider movably supported by the frame body, the slider being configured to linearly reciprocate in a first direction upon reception of the motive power transmitted from the rotation transmission member; and
a first rotating body and a second rotating body that are rotatably supported by the frame body, each of the first rotating body and the second rotating body being configured to, upon reception of the motive power transmitted from the slider, reciprocate in a corresponding one of a rotation direction about a second rotation axis as a center of rotation and a rotation direction about a third rotation axis as a center of rotation, the second rotation axis and the third rotation axis each extending in a second direction that is orthogonal to the first direction, the first rotating body and the second rotating body being arranged side by side in a third direction that is orthogonal to each of the first direction and the second direction;

the first wing unit having a proximal end and a distal end, the proximal end being fixed to the first rotating body such that the distal end is located on a side opposite to a side where the second rotating body is located, when seen from the first rotating body;

the second wing unit having a proximal end and a distal end, the proximal end being fixed to the second rotating body such that the distal end is located on a side opposite to a side where the first rotating body is located, when seen from the second rotating body;

the first wing unit and the second wing unit being configured to swing such that the distal end of the first wing unit and the distal end of the second wing unit synchronously move approximately in the first direction as the first rotating body reciprocates in the rotation direction about the second rotation axis and the second rotating body reciprocates in the rotation direction about the third rotation axis, respectively;

the power transmission mechanism further including a pair of crank arms each configured to connect the rotation transmission member and the slider, the pair of crank arms having:

respective first ends that are connected to an eccentric position of the rotation transmission member so as to be rotatable about a common rotation axis as a center of rotation, the common rotation axis extending in a direction parallel with an extending direction of the first rotation axis; and respective second ends that are separately connected to the slider so as to be rotatable about a corresponding one of separate rotation axes each as a center of rotation, the separate rotation axes extending in the direction parallel with the extending direction of the first rotation axis and being spaced apart from each other in the first direction, the second ends of the pair of crank arms being connected to the slider so as to be slidable in a direction orthogonal to the extending direction of the first rotation axis.

10. The wing flapping apparatus according to claim 9, wherein movement of the slider in the first direction and swinging of each of the first wing unit and the second wing unit in the first direction are opposite in direction to each other.

\* \* \* \* \*